(12) United States Patent
Nomoto et al.

(10) Patent No.: US 7,440,364 B2
(45) Date of Patent: Oct. 21, 2008

(54) TRACKING ERROR SIGNAL GENERATION DEVICE AND TRACKING ERROR SIGNAL GENERATION METHOD

(75) Inventors: Takayuki Nomoto, Saitama (JP); Hiroshi Nishiwaki, Saitama (JP)

(73) Assignee: Pioneer Corporation, Tokyo (JP)

( * ) Notice: Subject to any disclaimer, the term of this patent is extended or adjusted under 35 U.S.C. 154(b) by 227 days.

(21) Appl. No.: 10/591,273

(22) PCT Filed: Mar. 1, 2005

(86) PCT No.: PCT/JP2005/003397

§ 371 (c)(1),
(2), (4) Date: Oct. 31, 2006

(87) PCT Pub. No.: WO2005/083693

PCT Pub. Date: Sep. 9, 2005

(65) Prior Publication Data

US 2007/0189134 A1    Aug. 16, 2007

(30) Foreign Application Priority Data

Mar. 1, 2004  (JP) .............................. 2004-056705
Mar. 1, 2004  (JP) .............................. 2004-056710

(51) Int. Cl.
G11B 7/09    (2006.01)
(52) U.S. Cl. ................................. 369/44.41; 369/44.32

(58) Field of Classification Search ............. 369/44.41, 369/44.32
See application file for complete search history.

(56) References Cited

U.S. PATENT DOCUMENTS 4,965,781 A * 10/1990 Akiyama et al. .......... 369/44.35
7,177,245 B2 * 2/2007 Kwon et al. .............. 369/44.41

FOREIGN PATENT DOCUMENTS

| JP | 63-181126 | 7/1988 |
| JP | 2-64921 | 3/1990 |
| JP | 4-10230 | 1/1992 |
| JP | 2716569 | 11/1997 |
| JP | 10-308025 | 11/1998 |
| JP | 2001-338425 | 12/2001 |
| JP | 2002-251755 | 9/2002 |

* cited by examiner

*Primary Examiner*—Aristotelis M Psitos
(74) *Attorney, Agent, or Firm*—Young & Thompson

(57) ABSTRACT

A detection signal S1 outputted from a light reception unit (11A) of detection elements (11) formed by four-division light reception element is added to a detection signal S4 outputted from a light reception unit (11D) so as to obtain an addition signal S14 and a phase difference signal P1 indicating the phase difference between the addition signal S14 and the detection signal S1. Furthermore, a phase difference signal P4 indicating the phase difference between the addition signal S14 and the detection signal S4 is obtained. The phase difference signal P4 is subtracted from the phase difference signal P1 so as to generate a tracking error signal TE1.

9 Claims, 15 Drawing Sheets

[FIG. 1]
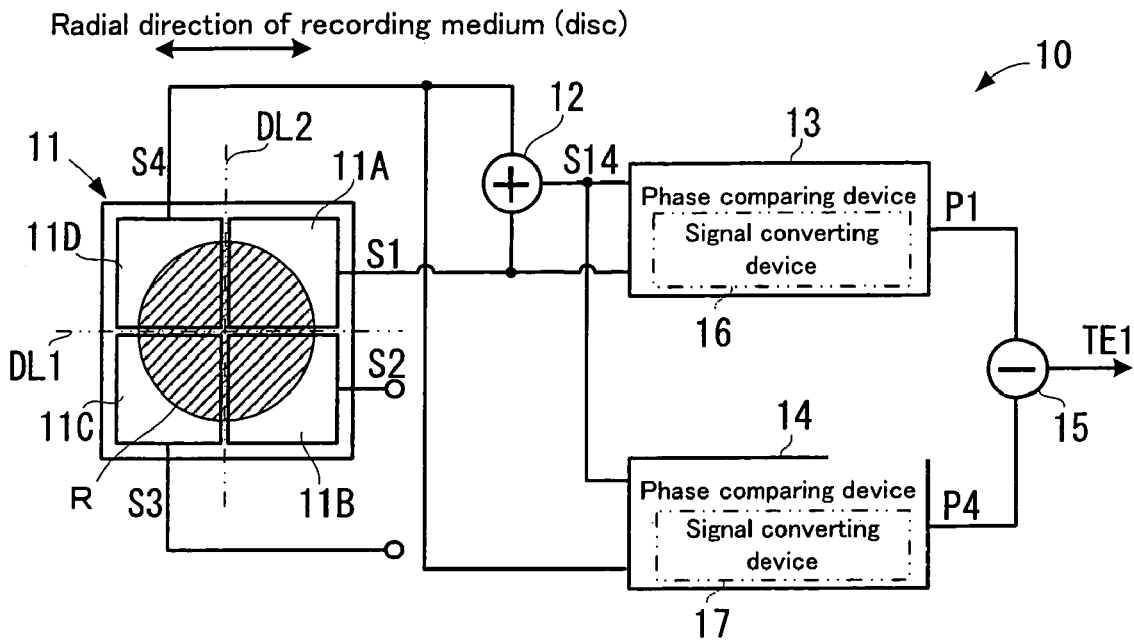
[FIG. 2]
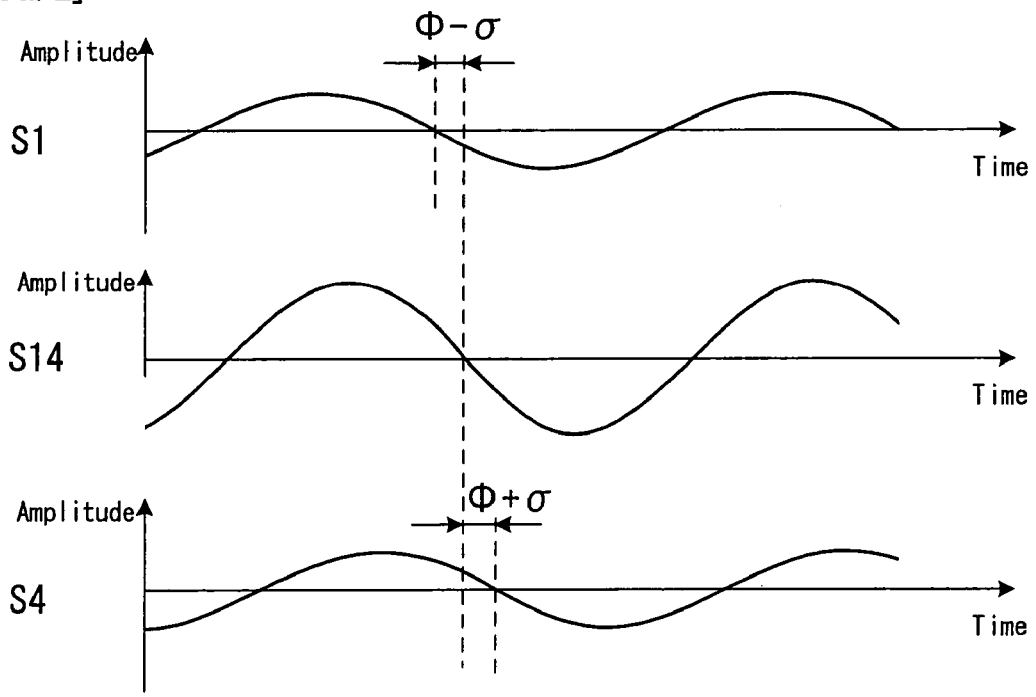

[FIG. 3]
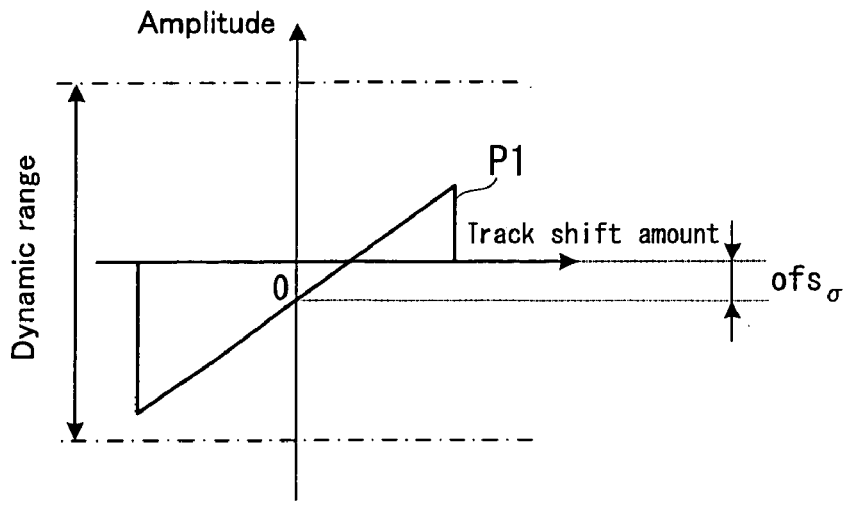
[FIG. 4]
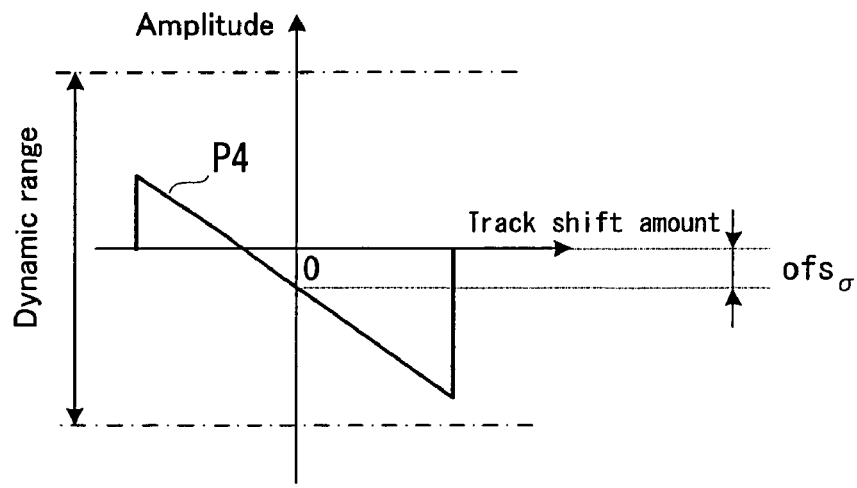
[FIG. 5]
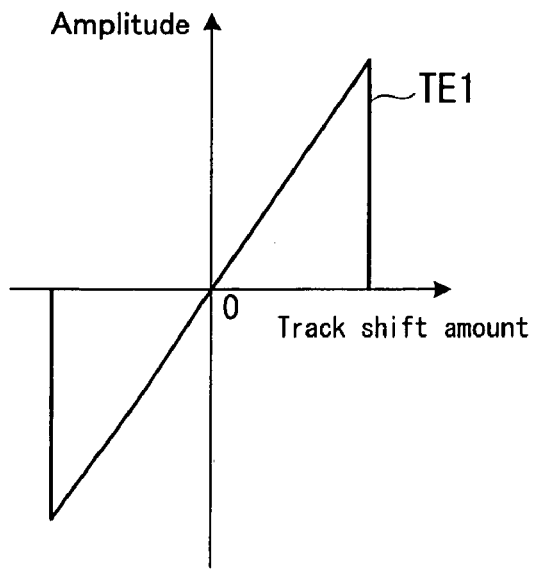

[FIG. 6]
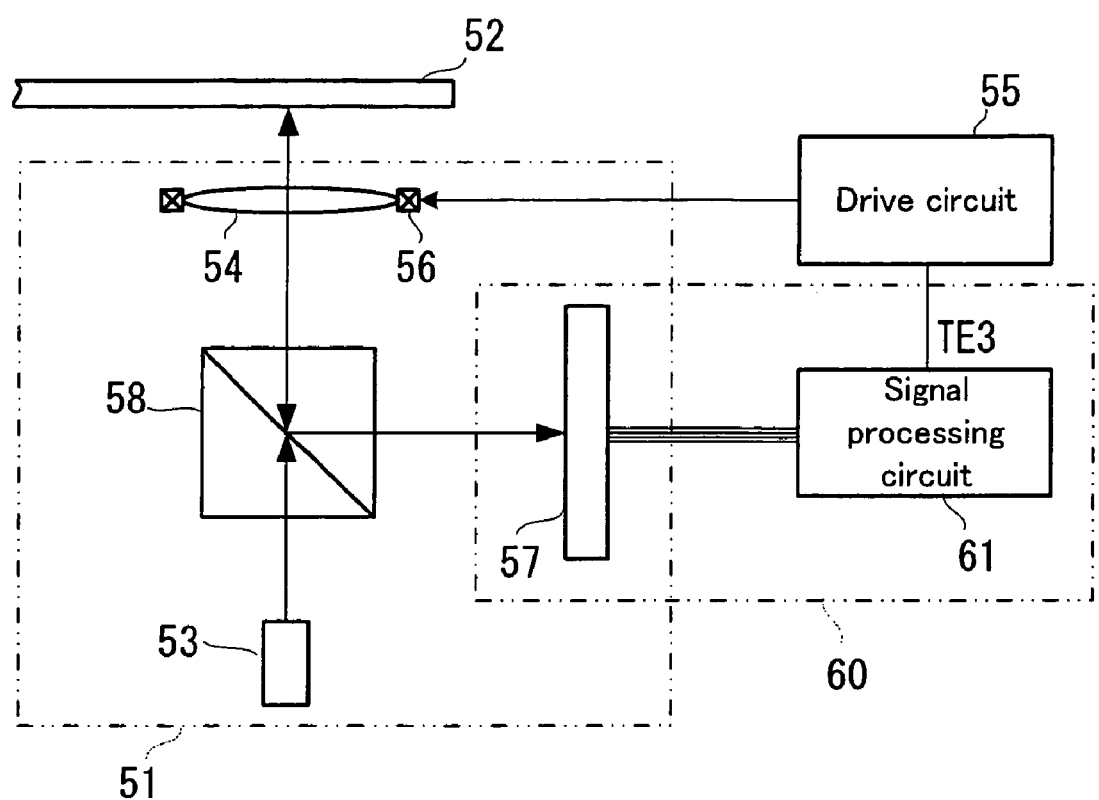

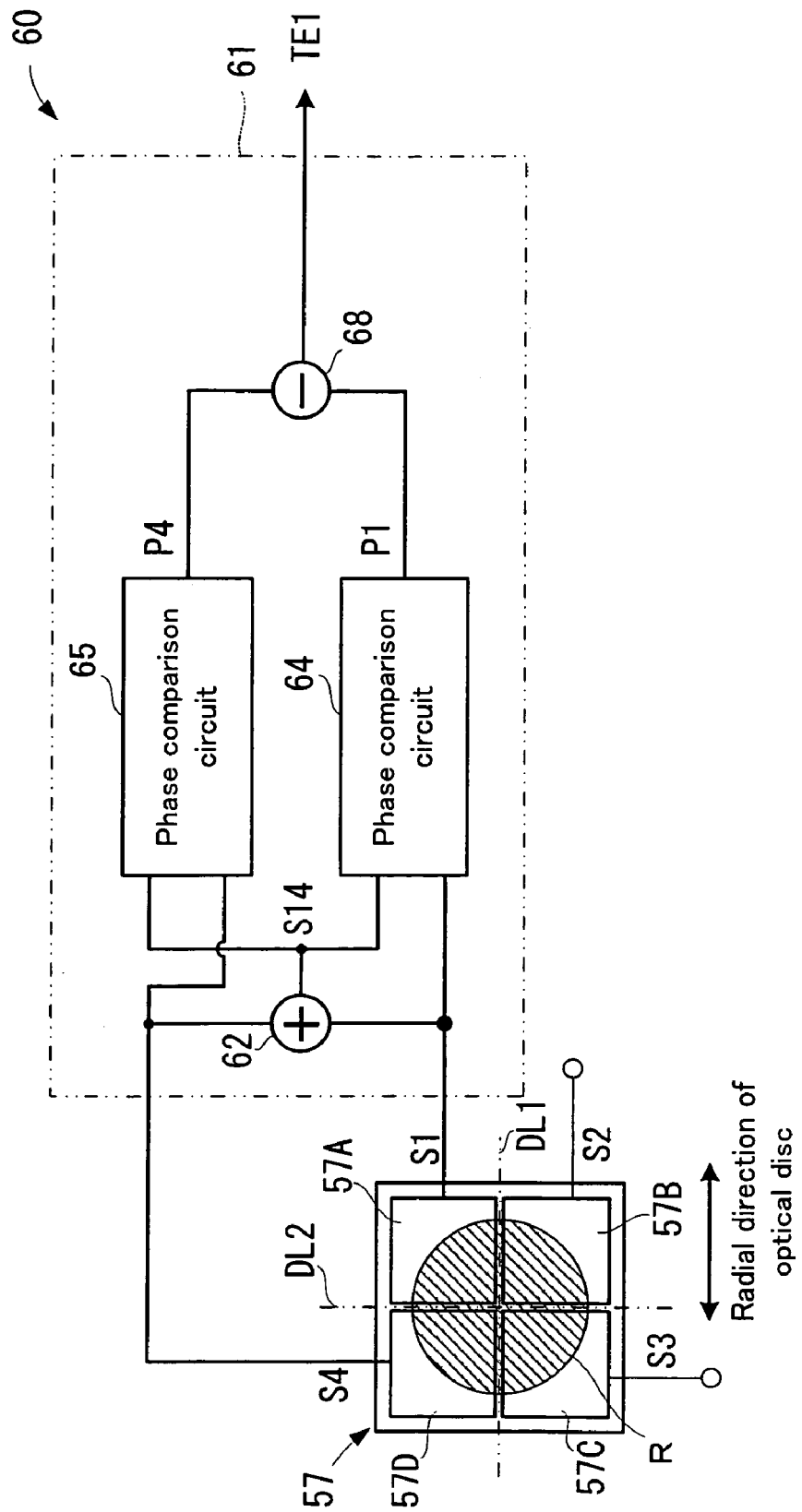
[FIG. 7]

[FIG. 8]
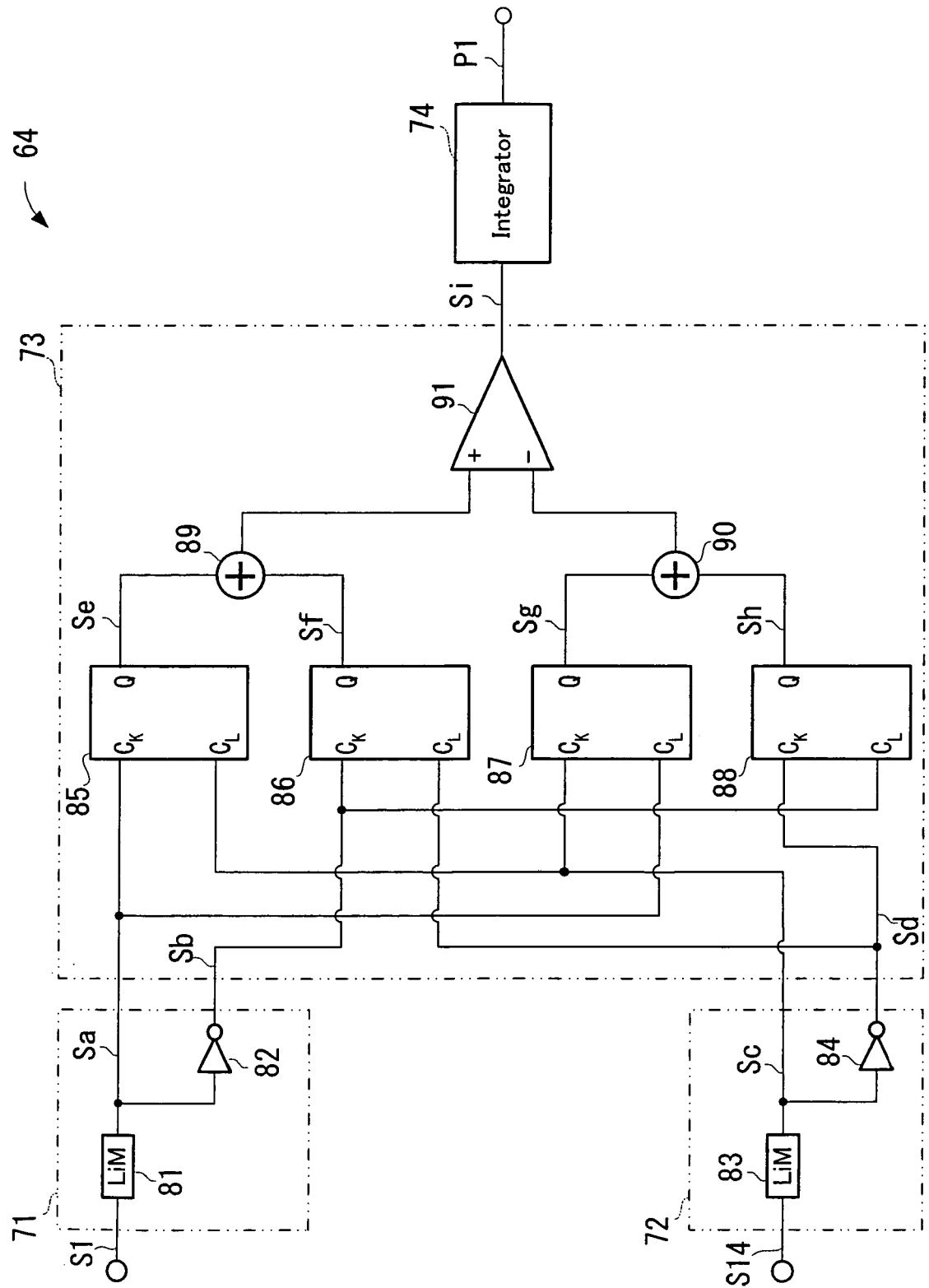

[FIG. 9]
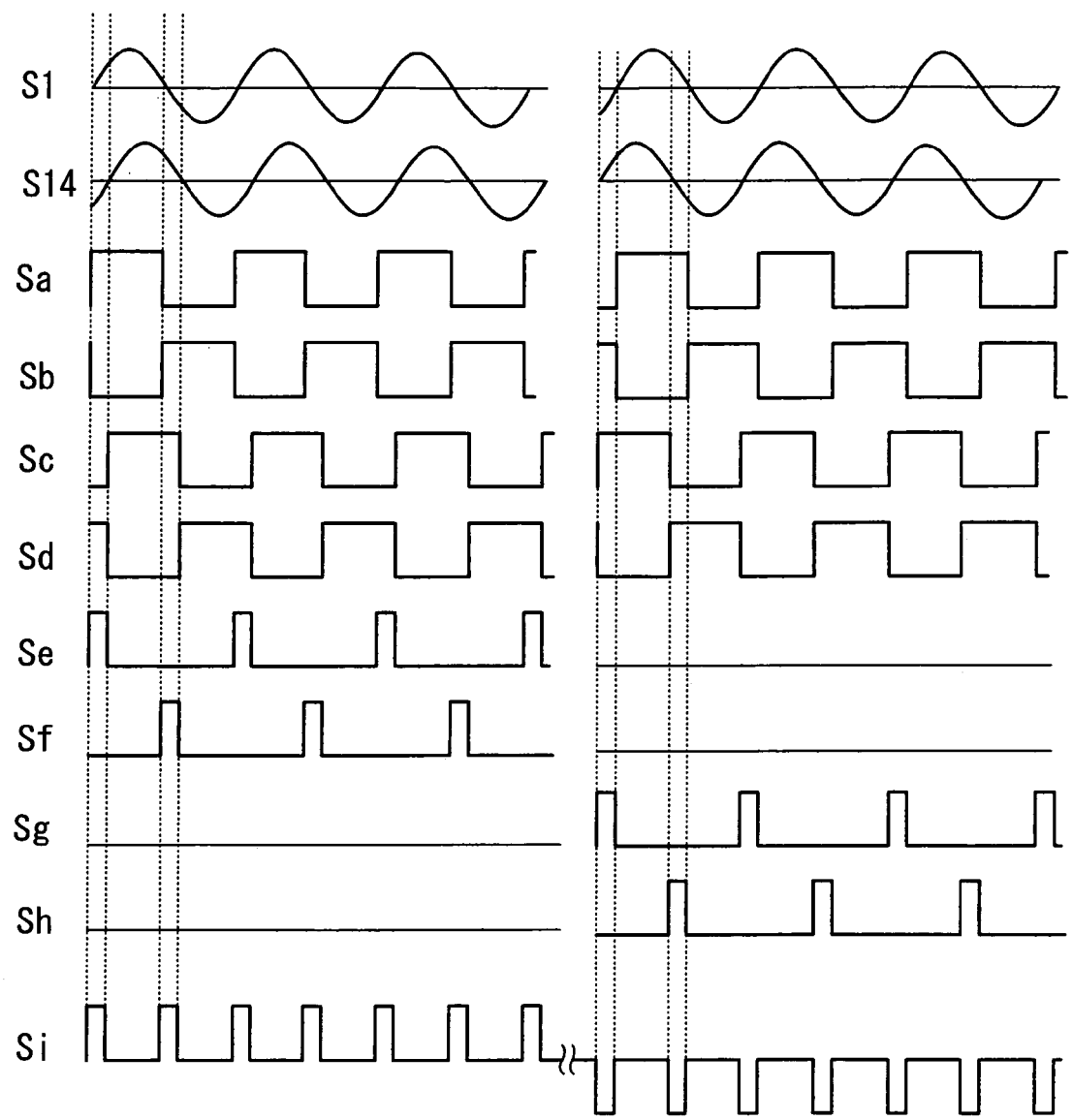

[FIG. 10]
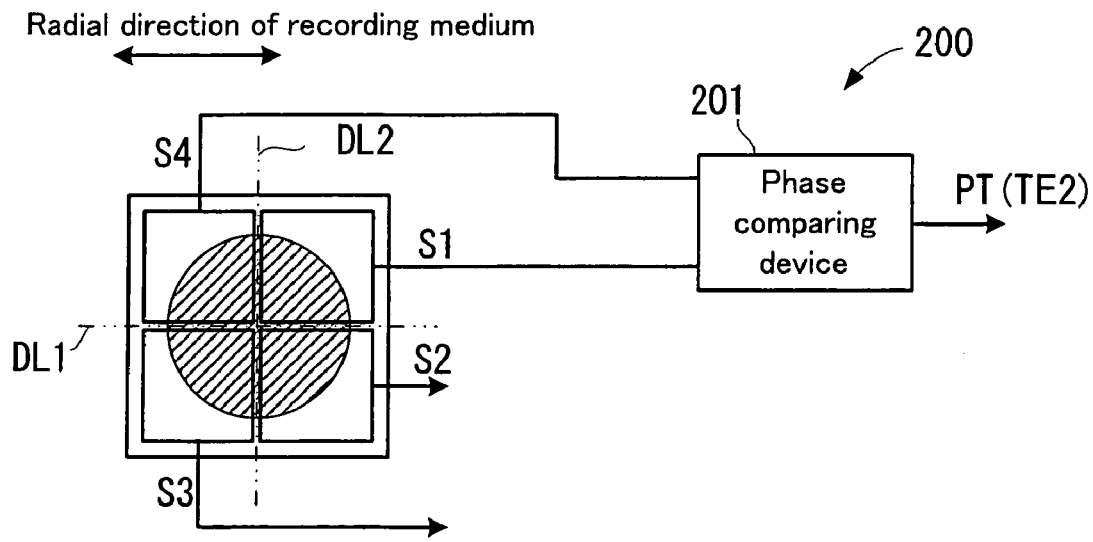
[FIG. 11]
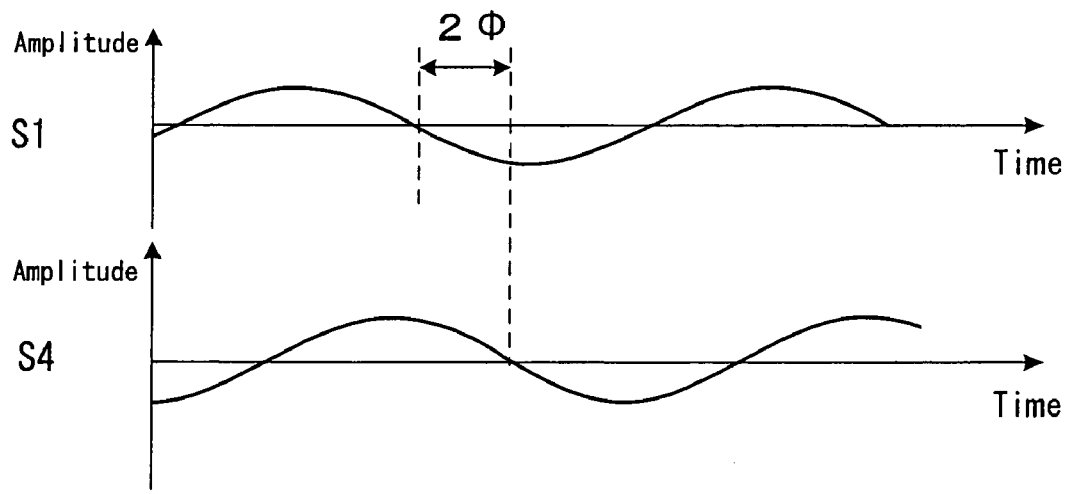

[FIG. 12]
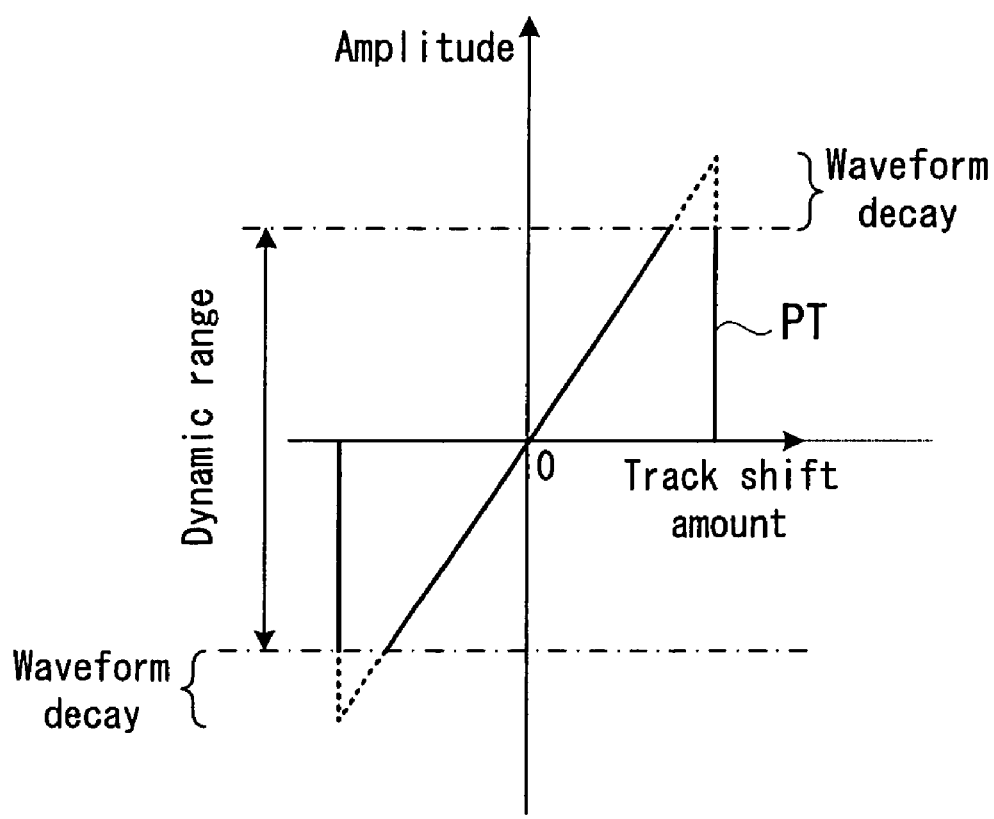

[FIG. 13]
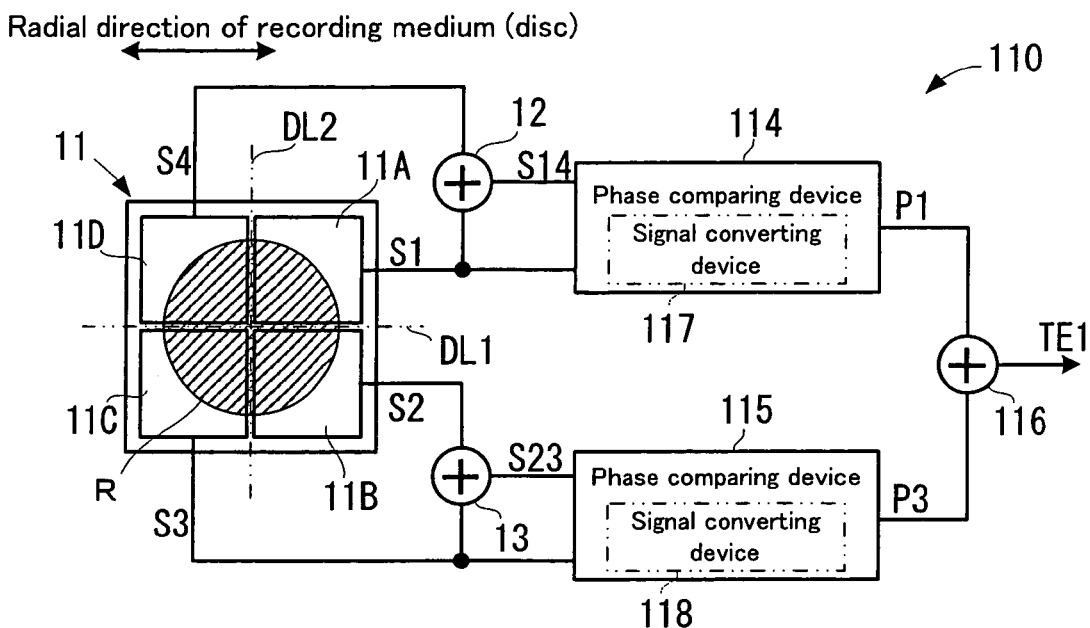
[FIG. 14]
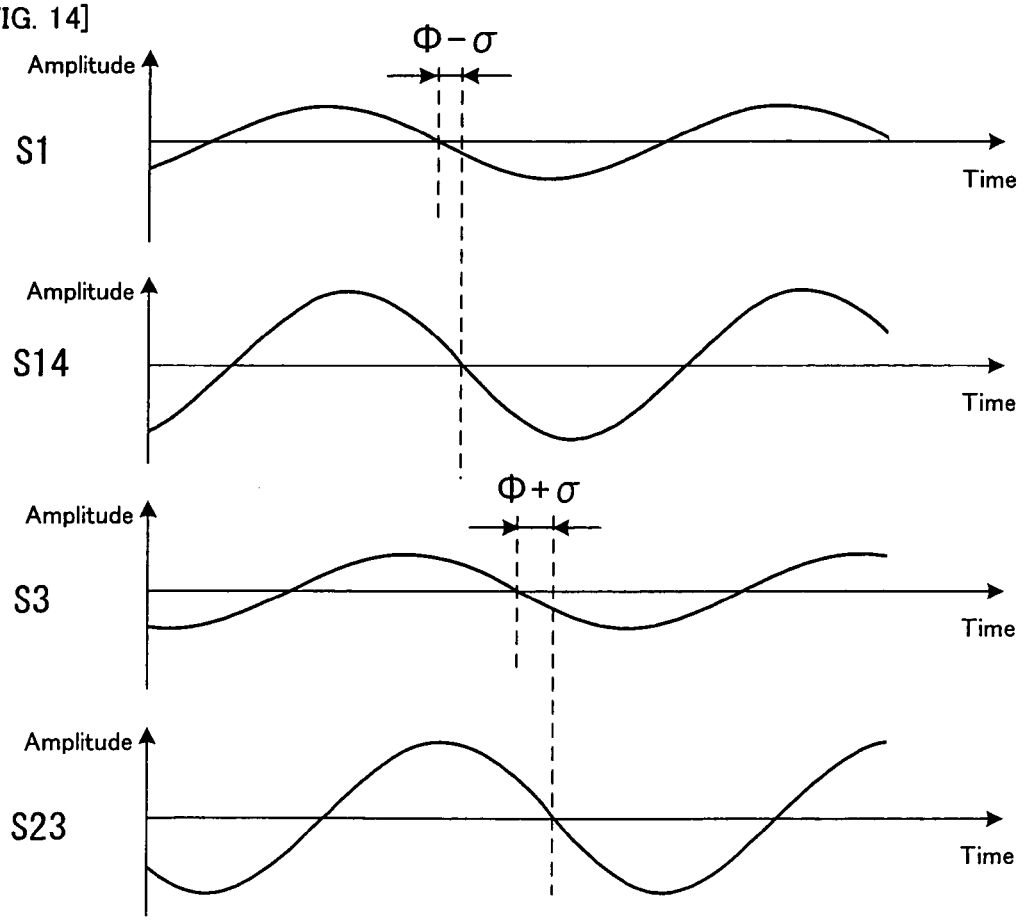

[FIG. 15]
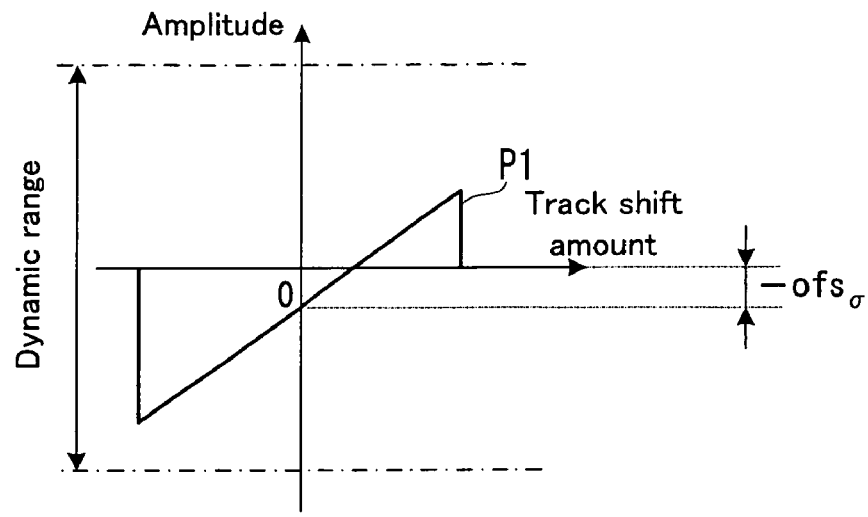
[FIG. 16]
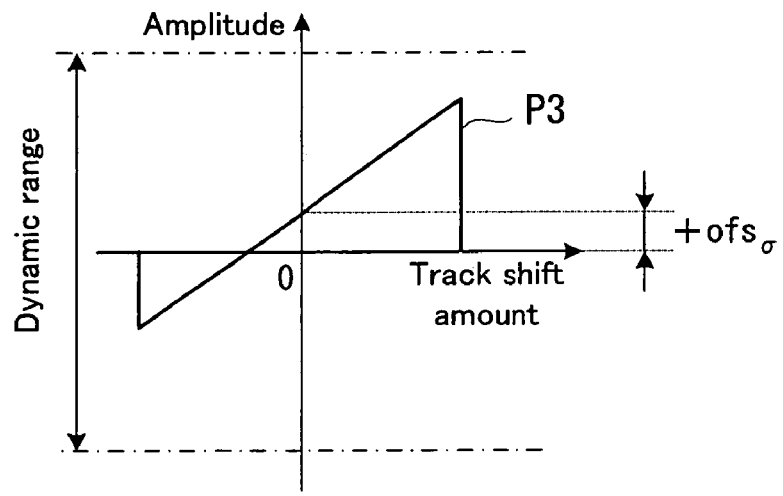

[FIG. 17]
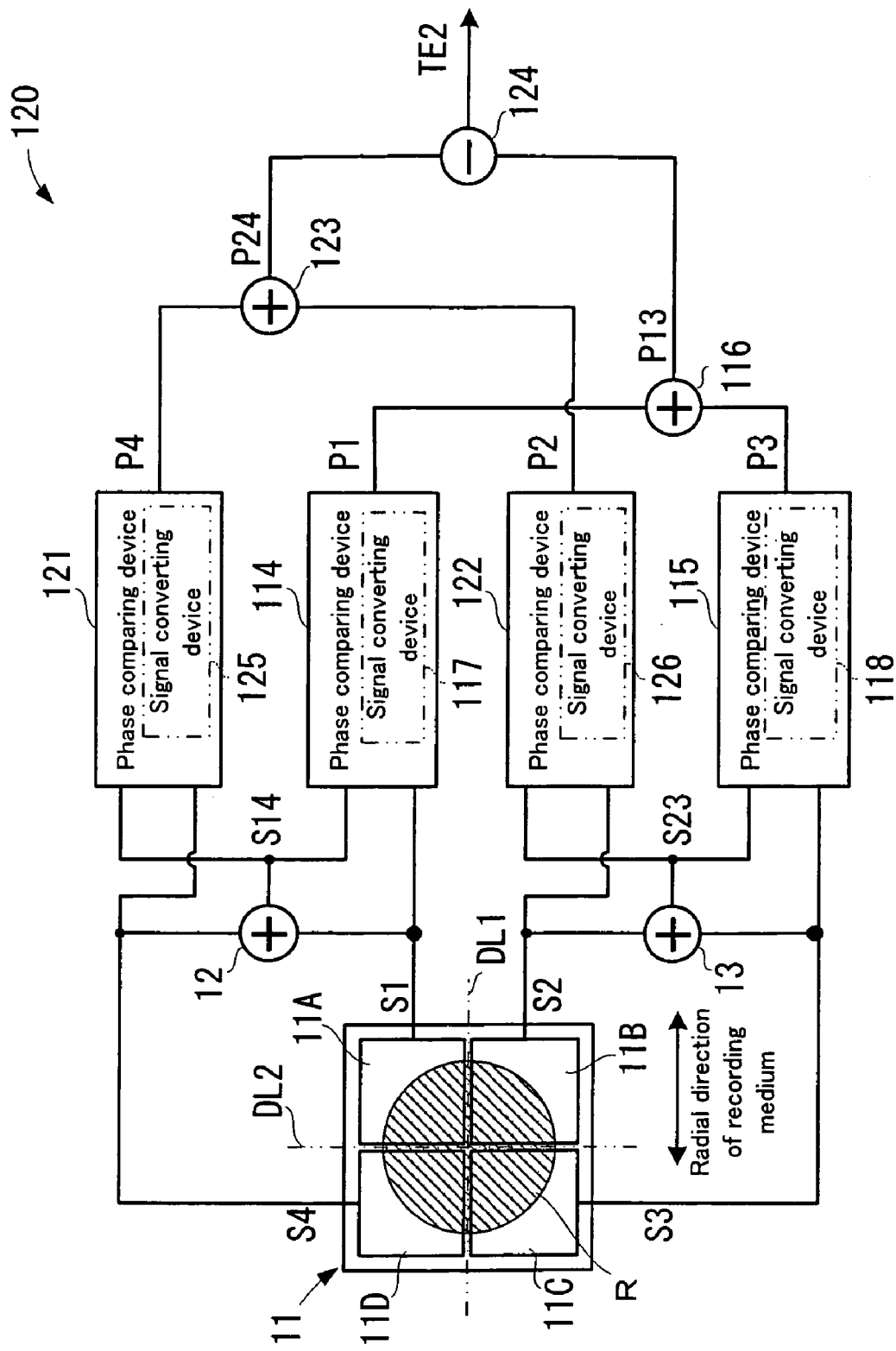

[FIG. 18]
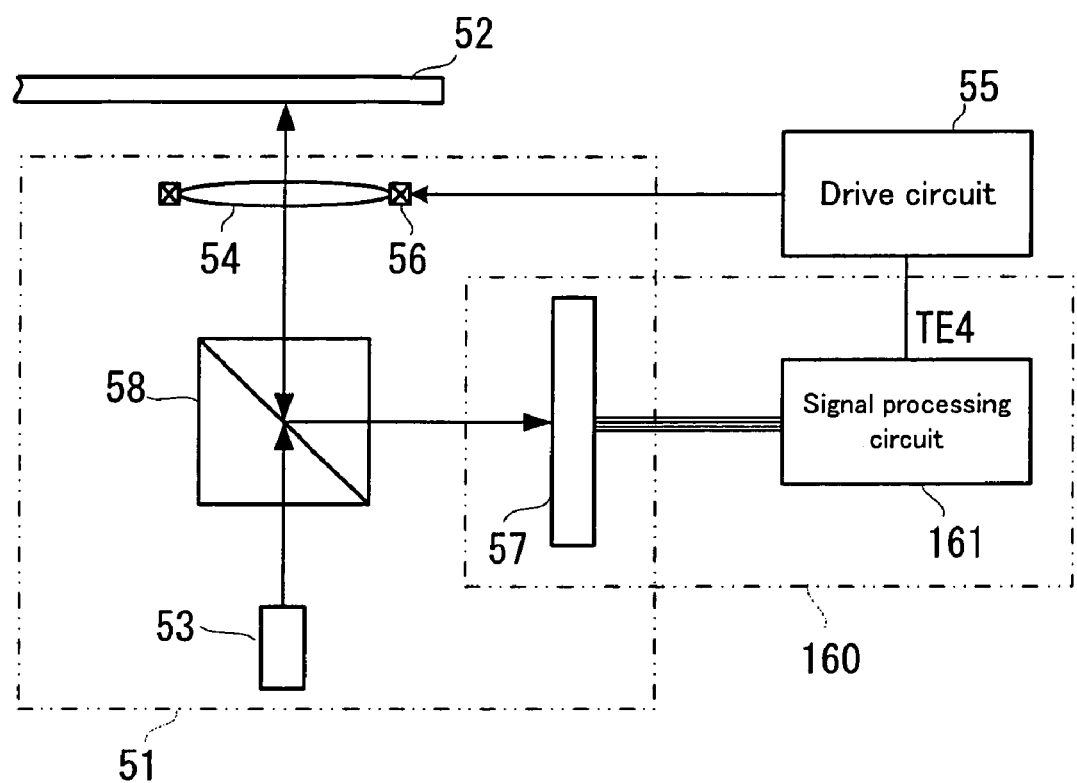

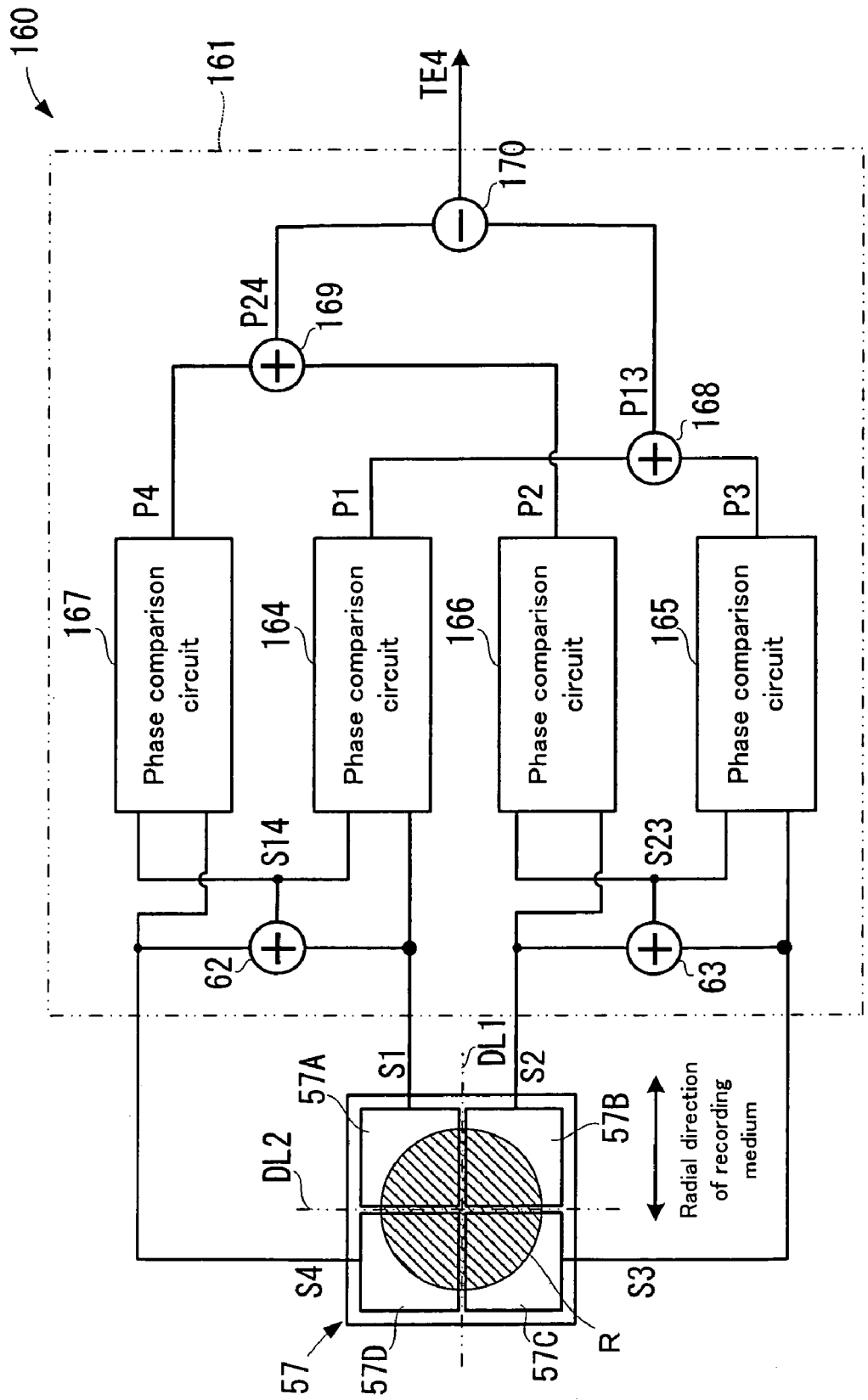
[FIG. 19]

[FIG. 20]
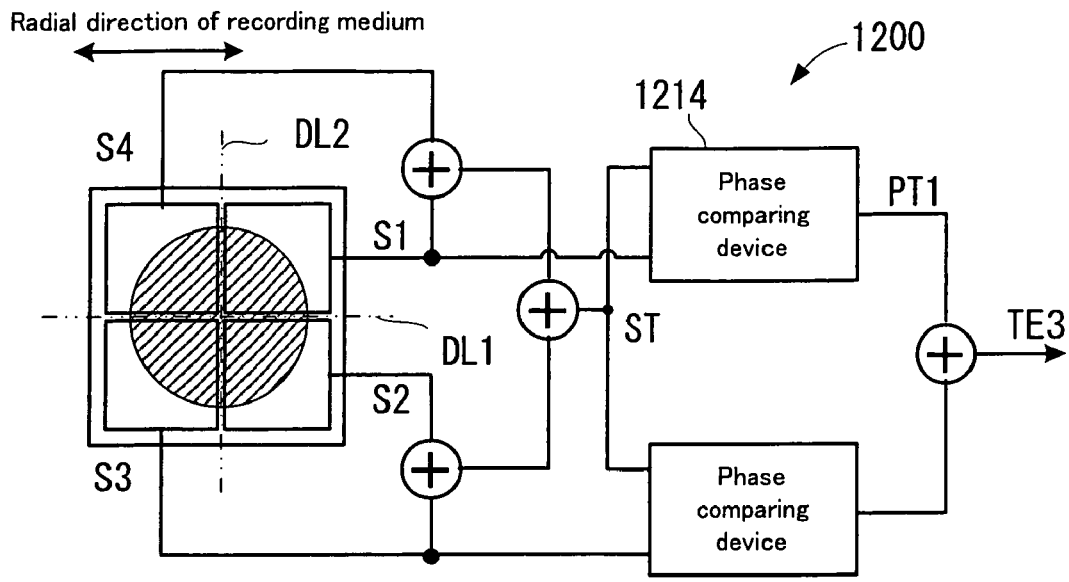
[FIG. 21]
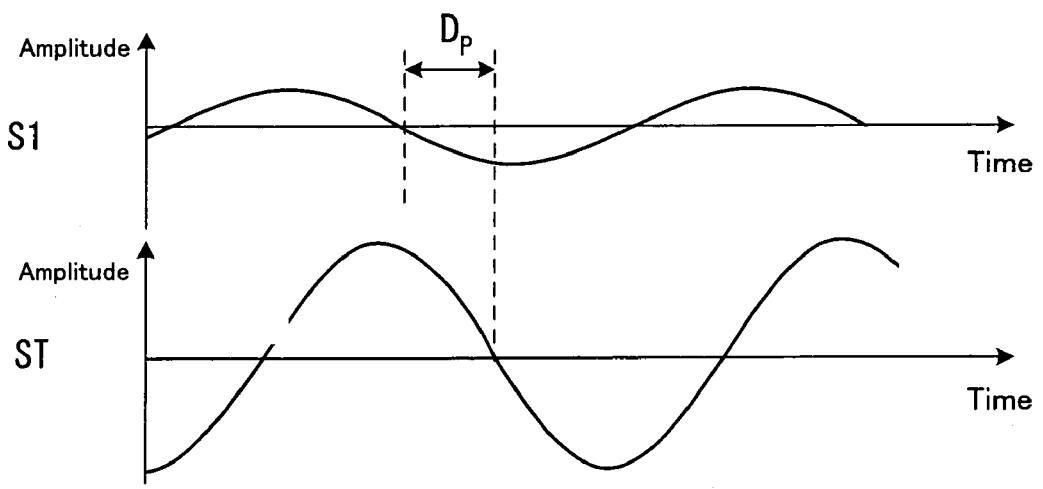

[FIG. 22]
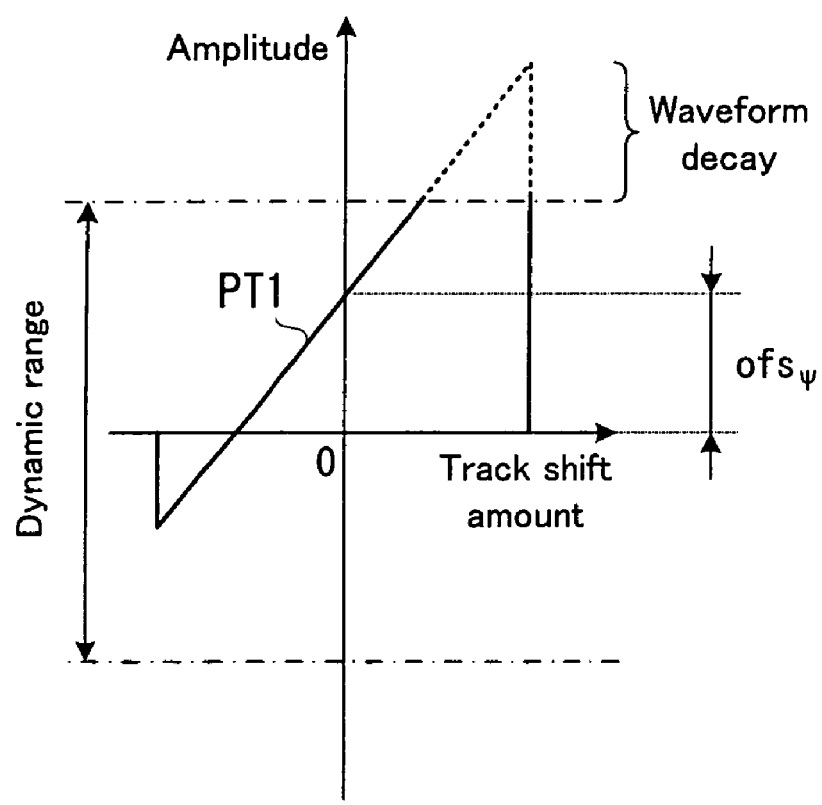

TRACKING ERROR SIGNAL GENERATION DEVICE AND TRACKING ERROR SIGNAL GENERATION METHOD

TECHNICAL FIELD

The present invention relates to a tracking error signal generating apparatus for and a tracking error signal generation method of generating a tracking error signal for tracking control which allows a light beam to follow a track on a recording surface of a recording medium.

BACKGROUND ART

In a recording medium, such as a DVD and a CD (Compact Disc), information is recorded as a pit row on the recording surface thereof. For example, in the case of a recording disc, the information is recorded on a track, which is formed spirally or concentrically.

In the case of an optical recording medium or a magneto optical recording medium or the like, when the information is recorded onto the recording medium, or when the information recorded on the recording medium is read, it is necessary to accurately position the spot of the light beam, which is irradiated from a pickup, on the track. In order to realize this positioning, a recording apparatus or a reproducing apparatus is provided with a tracking control circuit for tracking control which allows the light beam to follow the track.

The tracking control circuit is generally provided with: a light receiving element for receiving reflected light of the light beam from the recording surface of the recording medium and for converting the reflected light to an electrical signal; a signal processing circuit for generating a tracking error signal which indicates a shift amount between the spot of the laser light and the track, on the basis of the electrical signal outputted from the light receiving element; and a drive circuit for displacing the position of an objective lens located in the pickup or the position of the pickup itself, in accordance with the tracking error signal.

As a tracking control method performed on such a tracking control circuit, generally, a Differential Phase Detection method is known. The Differential Phase Detection method uses a four-division light receiving element which has four light receiving units, divided by a first dividing line extending in a direction of crossing the track and a second dividing line extending in a direction along the track. Then, a sum signal obtained from two light receiving units located on one diagonal out of the four light receiving units and a sum signal obtained from the other two light receiving units located on other diagonal are obtained. The tracking error signal is generated on the basis of a phase difference between two sum signals.

In the Differential Phase Detection method, however, if a pit depth formed on the recording surface of the record medium is shifted from $\lambda/4n$, there is such a problem that offset occurs in the tracking error signal and this offset may prevent the realization of tracking control. Incidentally, $\lambda$ is the wavelength of the light beam, and n is the refractive index of a cover layer of the recording medium.

Moreover, Japanese Patent Application Laid Open NO. 2001-338425 (patent document 1) discloses a tracking control method (hereinafter referred to as a "conventional tracking control method") using the four-division light receiving element, as in the case of the Differential Phase Detection method. In the conventional tracking control method, phases of signals outputted from two light receiving units located on one side of a boundary made by the first dividing line extending in a direction of crossing the track are compared. Moreover, a phase difference signal with an amplitude corresponding to a phase difference between the signals is generated, and the phase difference signal is used as the tracking error signal.

According to the conventional tracking control method, even if the pit depth of the recording medium is shifted from $\lambda/4n$, the offset does not appear in the tracking error signal. Thus, according to the conventional tracking control method, it is possible to solve the above-mentioned problem in the Differential Phase Detection method in a sort.

Moreover, Patent Publication NO. 2716569 (patent document 2) discloses a tracking control method (hereinafter referred to as a "conventional tracking control method") using the four-division light receiving element, as in the case of the Differential Phase Detection method. In the conventional tracking control method, a phase of a first electrical signal outputted from one of a certain pair of light receiving units located in the diagonal position out of the four light receiving units of the four-division light receiving element is compared with a phase of a sum signal of electrical signals outputted from the respective four light receiving units. Moreover, a first phase difference signal with an amplitude corresponding to a phase difference between the first electrical signal and the sum signal is generated. Furthermore, phases of a second electrical signal outputted from the other of the certain pair of light receiving units is compared with the sum signal of electrical signals outputted from the respective four light receiving units. Moreover, a second phase difference signal with an amplitude corresponding to a phase difference between the second electrical signal and the sum signal is generated. Then, a signal which is obtained by adding the first phase difference signal and the second phase difference signal is used as the tracking error signal.

According to the conventional tracking control method, even if the pit depth of the recording medium is shifted from $\lambda/4n$, the offset caused by this shift can be eliminated in the tracking error signal generation procedure. Hereinafter, an outline for the elimination of the offset component by the conventional tracking control method will be explained. Namely, if the pit depth of the recording medium is shifted from $\lambda/4n$, the phase of the first electrical signal proceeds in accordance with the shift amount of the pit depth with respect to the phase of the sum signal. As a result, the offset component (e.g. a minus amplitude component) corresponding to the shift amount of the pit depth appears in the first phase difference signal. Moreover, if the pit depth of the recording medium is shifted from $\lambda/4n$, the phase of the second electrical signal delays in accordance with the shift amount of the pit depth with respect to the phase of the sum signal. As a result, the offset component (e.g. a plus amplitude component) corresponding to the shift amount of the pit depth appears in the second phase difference signal. Then, if the first phase difference signal and the second phase difference signal are added to each other, the two offset components corresponding to the shift amount of the pit depth is canceled. As described above, according to the conventional tracking control method, it is possible to eliminate the offset caused by the shift of the pit depth in the tracking error signal generation procedure, and it is possible to solve the above-mentioned problem in the differential phase detection.

Patent document 1: Japanese Patent Application Laid Open NO. 2001-338425 (FIG. 3)

Patent document 2: Patent Publication NO. 2716569

DISCLOSURE OF INVENTION

Subject to be Solved by the Invention

By the way, in the conventional tracking control method, phases of signals outputted from two light receiving units (referred to as a "first light receiving unit" and a "second light receiving unit"_in this paragraph) located on one side of a boundary made by the first dividing line extending in a direction of crossing the track are compared. Moreover, a phase difference signal with an amplitude corresponding to a phase difference between the signals is generated. Explaining this more specifically, for example, when the spot of the light beam is off the track, the phase of a signal outputted from the first light receiving unit proceeds by Φ, in accordance with the shift amount between the spot of the light beam and the track, while the phase of a signal outputted from the second light receiving unit delays by Φ, in accordance with the shift amount between the spot of the light beam and the track. Thus, if the phase of the signal outputted from the first light receiving unit and the phase of the signal outputted from the second light receiving unit are compared, the phase difference between the signals is 2Φ. Consequently, the amplitude of the phase difference signal becomes large.

If the amplitude of the phase difference signal becomes large, it is necessary that the dynamic range of a phase comparison circuit or an integration circuit (an integration circuit for converting a phase difference on a time axis to an amplitude), used for the generation of a phase difference signal, is set to be large. Setting the dynamic range of the phase comparison circuit or the integration circuit to be large causes a disadvantage of unstable tracking control.

On the other hand, according to the conventional tracking control method, it is possible to eliminate the offset which appears in the tracking error signal, caused by that the pit depth is shifted from $\lambda/4n$. However, the above-mentioned conventional tracking control method has other problems as described below.

Namely, if the pit depth is shifted from $\lambda/4n$, the phase of the first electrical signal proceeds in accordance with the shift amount of the pit depth with respect to the phase of the sum signal, for example. As a result, the offset component (e.g. a minus amplitude component) corresponding to the shift amount of the pit depth appears in the first phase difference signal. Moreover, if the pit depth of the recording medium is shifted from $\lambda/4n$, the phase of the second electrical signal delays in accordance with the shift amount of the pit depth with respect to the phase of the sum signal. As a result, the offset component (e.g. a plus amplitude component) corresponding to the shift amount of the pit depth appears in the second phase difference signal. Then, as the shift amount of the pit depth from $\lambda/4n$ increases, the offset, which is caused by that the pit depth is shifted from $\lambda/4n$, increases. Thus, if the conventional tracking control method is adopted for a recording medium with a pit depth of $\lambda/6n$, the offset components which appear in both the first and second phase difference signals increase, and by this, the amplitude change ranges of both the first and second phase difference signals increase. As a result, it is necessary that the dynamic range of a phase comparison circuit or an integration circuit (an integration circuit for converting a phase difference on a time axis to an amplitude), used for the generation of the first and second phase difference signals, is set to be large. Setting the dynamic range of the phase comparison circuit or the integration circuit to be large causes a disadvantage of unstable tracking control, for example.

Incidentally, a DVD generally has a pit depth of $\lambda/4n$. Moreover, the pit depth varies sometimes in a mass production procedure. However, even if the pit depth varies, the pit depth of the DVD is not greatly shifted from $\lambda/4n$. Thus, as long as the conventional tracking control method is applied to the DVD, a large offset component is not generated in the tracking error signal generation procedure, and this does not worsen the problem of setting the dynamic range of the phase comparison circuit or the integration circuit to be large and the problem of unstable tracking control. However, if the conventional tracking control method is applied not to the DVD but to the recording medium with a pit depth of $\lambda/6n$, for example, a large offset component is generated in the tracking error signal generation procedure, and this worsens the problem of setting the dynamic range of the phase comparison circuit or the integration circuit to be large and the problem of unstable tracking control caused by the extended dynamic range.

In order to solve the above-described problems, it is therefore a first object of the present invention to provide a tracking error signal generating apparatus and a tracking error signal generating method in which stability of tracking control can be ensured.

Moreover, it is a second object of the present invention to provide a tracking error signal generating apparatus and a tracking error signal generating method in which stability of tracking control can be ensured even if the pit depth of a recording medium is not $\lambda/4n$.

Means for Solving the Subject

In order to solve the above objects of the present invention, a tracking error signal generating apparatus according to claim 1 is a tracking error signal generating apparatus for generating a tracking error signal for tracking control which allows a light beam to follow a track on a recording surface of a recording medium, the tracking error signal generating apparatus provided with: a detecting device, which has four light receiving units divided by a first dividing line extending in a direction corresponding to a direction of crossing the track and a second dividing line extending in a direction corresponding to a direction along the track, for receiving reflected light of the light beam from the recording surface with the four light receiving units and for outputting detection signals corresponding to the reflected light received by the respective light receiving units; an adding device for adding the detection signals outputted from a first light receiving unit and a second light receiving unit, located on one side of a boundary made by the first dividing line, out of the four light receiving units and for outputting a result of the addition as an added signal; a first phase comparing device for outputting a first phase difference signal which indicates a phase difference between the detection signal outputted from the first light receiving unit and the added signal; a second phase comparing device for outputting a second phase difference signal which indicates a phase difference between the detection signal outputted from the second light receiving unit and the added signal; and a subtracting device for subtracting the second phase difference signal from the first phase difference signal.

In order to solve the above objects of the present invention, a tracking error signal generating method according to claim 3 is a tracking error signal generating method of generating a tracking error signal for tracking control which allows a light beam to follow a track on a recording surface of a recording medium, the tracking error signal generating method provided with: a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and of outputting detection signals corresponding to the reflected light received by the respective light receiving units; an adding process of adding the detection signals outputted from a first light receiving unit and a second light receiving unit, located on one side of a boundary made by the first dividing line, out of the four light receiving units and of outputting a result of the addition as an added signal; a first phase comparing process of outputting a first phase difference signal which indicates a phase difference between the detection signal outputted from the first light receiving unit and the added signal; a second phase comparing process of outputting a second phase difference signal which indicates a phase difference between the detection signal outputted from the second light receiving unit and the added signal; and a subtracting process of subtracting the second phase difference signal from the first phase difference signal.

In order to solve the above objects of the present invention, a tracking error signal generating apparatus according to claim 4 is a tracking error signal generating apparatus for generating a tracking error signal for tracking control which allows a light beam to follow a track on a recording surface of a recording medium, the tracking error signal generating apparatus provided with: a detecting device, which has four light receiving units divided by a first dividing line extending in a direction corresponding to a direction of crossing the track and a second dividing line extending in a direction corresponding to a direction along the track, for receiving reflected light of the light beam from the recording surface with the four light receiving units and for outputting detection signals corresponding to the reflected light received by the respective light receiving units; a first adding device for adding the detection signals outputted from a first light receiving unit and a second light receiving unit, located on one side of a boundary made by the first dividing line, out of the four light receiving units and for outputting a result of the addition as a first added signal; a second adding device for adding the detection signals outputted from a third light receiving unit and a fourth light receiving unit, located on the other side of the boundary made by the first dividing line, out of the four light receiving units and for outputting a result of the addition as a second added signal; a first phase comparing device for outputting a first phase difference signal which indicates a phase difference between the detection signal outputted from the first light receiving unit and the first added signal; a second phase comparing device for outputting a second phase difference signal which indicates a phase difference between the detection signal outputted from the third light receiving unit diagonally adjacent to the first light receiving unit and the second added signal; and a third adding device for adding the first phase difference signal and the second phase difference signal to each other.

In order to solve the above objects of the present invention, a tracking error signal generating method according to claim 8 is a tracking error signal generating method of generating a tracking error signal for tracking control which allows a light beam to follow a track on a recording surface of a recording medium, the tracking error signal generating method provided with: a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and for outputting detection signals corresponding to the reflected light received by the respective light receiving units; a first adding process of adding the detection signals outputted from a first light receiving unit and a second light receiving unit, located on one side of a boundary made by the first dividing line, out of the four light receiving units and for outputting a result of the addition as a first added signal; a second adding process of adding the detection signals outputted from a third light receiving unit and a fourth light receiving unit, located on the other side of the boundary made by the first dividing line, out of the four light receiving units and for outputting a result of the addition as a second added signal; a first phase comparing process of outputting a first phase difference signal which indicates a phase difference between the detection signal outputted from the first light receiving unit and the first added signal; a second phase comparing process of outputting a second phase difference signal which indicates a phase difference between the detection signal outputted from the third light receiving unit diagonally adjacent to the first light receiving unit and the second added signal; and a third adding process of adding the first phase difference signal and the second phase difference signal to each other.

These effects and other advantages of the present invention will be more apparent from the following embodiments.

BRIEF DESCRIPTION OF DRAWINGS

FIG. 1 is a block diagram showing a tracking error signal generating apparatus in a first embodiment of the present invention.

FIG. 2 is a waveform chart showing the operation of the tracking error signal generating apparatus shown in FIG. 1.

FIG. 3 is a waveform chart showing the operation of the tracking error signal generating apparatus shown in FIG. 1.

FIG. 4 is a waveform chart showing the operation of the tracking error signal generating apparatus shown in FIG. 1.

FIG. 5 is a waveform chart showing a tracking error signal generated by the tracking error signal generating apparatus shown in FIG. 1.

FIG. 6 is a block diagram showing a tracking error signal generating apparatus in a first example of the present invention, together with an optical disc, a pickup, and a drive circuit.

FIG. 7 is a block diagram showing the tracking error signal generating apparatus shown in FIG. 6.

FIG. 8 is a circuit diagram showing the inner structure of a phase comparison circuit in FIG. 7.

FIG. 9 is a waveform chart showing the operation of the phase comparison circuit shown in FIG. 8.

FIG. 10 is a block diagram showing a conventional tracking error signal generating apparatus.

FIG. 11 is a waveform chart showing the operation of the conventional tracking error signal generating apparatus in FIG. 10.

FIG. 12 is a waveform chart showing the operation of the conventional tracking error signal generating apparatus in FIG. 10

FIG. 13 is a block diagram showing a tracking error signal generating apparatus in a third embodiment of the present invention.

FIG. 14 is a waveform chart showing the operation of the tracking error signal generating apparatus shown in FIG. 13.

FIG. 15 is a waveform chart showing the operation of the tracking error signal generating apparatus shown in FIG. 13.

FIG. 16 is a waveform chart showing the operation of the tracking error signal generating apparatus shown in FIG. 13.

FIG. 17 is a block diagram showing a tracking error signal generating apparatus in a fourth embodiment of the present invention.

FIG. 18 is a block diagram showing a tracking error signal generating apparatus in a second example of the present invention, together with an optical disc, a pickup, and a drive circuit.

FIG. 19 is a block diagram showing the tracking error signal generating apparatus in FIG. 18.

FIG. 20 is a block diagram showing the conventional tracking error signal generating apparatus.

FIG. 21 is a waveform chart showing the operation of the conventional tracking error signal generating apparatus shown in FIG. 21.

FIG. 22 is a waveform chart showing the operation of the conventional tracking error signal generating apparatus shown in FIG. 21.

DESCRIPTION OF REFERENCE CODES 10, 60, 110, 120, 160 . . . tracking error signal generating apparatus
11 . . . detecting device
12, 13, 116, 123 . . . adding device
13, 14, 114, 115, 121, 122 . . . phase comparing device
15, 124 . . . subtracting device
57 . . . four-division light receiving element
62, 63, 70, 168, 169 . . . adder
64, 65, 66, 67, 164, 165, 166, 167 . . . phase comparison circuit
68, 69, 170 . . . subtractor

BEST MODE FOR CARRYING OUT THE INVENTION

Hereinafter, embodiments of the present invention will be explained with reference to the drawings. Incidentally, in the content of the drawings used for the explanation of the embodiments of the present invention, the constitutional elements or the like of the present invention are embodied in order to explain the technical ideas of the present invention, and the shape, size, position, relation of connection of each constitutional element or the like are not limited to this content. Moreover, more specific or concrete examples for carrying out the present invention will be described under the section of "Examples".

FIRST EMBODIMENT

FIG. 1 shows a tracking error signal generating apparatus 10 in a first embodiment of the present invention. The tracking error signal generating apparatus 10 is an apparatus for generating a tracking error signal for tracking control which allows a light beam to follow a track on the recording surface of a recording medium. The tracking error signal generating apparatus 10 can be used mainly to realize tracking control for a recording medium of an optical type or magneto optical type, such as a DVD, CD, a MO (Magneto-Optical) disc, a DVD-ROM, a DVD-RAM, or a Blu-ray disc. For example, the tracking error signal generating apparatus 10 can be provided for a disc drive or the like, mounted on or connected to Blu-ray disc player/recorder, a computer, or the like. Incidentally, the tracking error signal generating apparatus 10 can be applied to a recording/reproducing apparatus for a non-rotary recording medium, for example, of such a type that information is recorded or reproduced by linearly displacing the recording medium or a pickup (head) in an X direction and a Y direction on the recording plane.

The tracking error signal generating apparatus 10 is provided with: a detecting device 11; an adding device 12; a phase comparing device 13; a phase comparing device 14; and a subtracting device 15.

The detecting device 11 has a light receiving surface, which is provided thereon with four light receiving units 11A, 11B, 11C and 11D divided by a diving line DL1 and a dividing line DL2. Then, the detecting device 11 receives reflected light R from the recording surface of the recording medium with the four light receiving units 11A to 11D, and outputs detection signals S1, S2, S3 and S4 corresponding to the reflected light received by the respective four light receiving units 11A to 11D.

The diving line DL1 extends in a direction corresponding to a direction of crossing the track of the recording medium. For example, if the recording medium is an optical disc, for example, the dividing line DL1 extends in a direction corresponding to the radial direction of the optical disc. On the other hand, the diving line DL2 extends in a direction corresponding to a direction along the track (a track direction). If the spot of the light beam on the recording surface of the recording medium is displaced in the direction of crossing the track (e.g. the radial direction of the optical disc), an image of the reflected light R irradiated onto the light receiving units 11A to 11D is displaced in a direction along the dividing line DL1.

As the detecting device 11, a four-division light receiving element can be used. According to the four-division light receiving element, it is possible to photoelectrically convert, on each light receiving unit, the reflected light R received by the four light receiving units. By this, it is possible to obtain four electrical signals corresponding to the quantity of light (intensity distribution) of respective portions of the reflected light R divided into the four portions. Then, the electrical signals can be used as the detection signals S1 to S4. Incidentally, the four-division light receiving element is normally disposed in the pickup, together with an optical system, such as a semiconductor laser, a beam splitter, and various lenses for detection.

The adding device 12 adds the detection signals S1 and S4 respectively outputted from the light receiving units 11A and 11D located on one side of a boundary made by the dividing DL1, out of the light receiving units 11A to 11D, and outputs the result of addition as an added signal S14. As the adding device 12, an adder and a waveform shaping circuit can be used.

The phase comparing device 13 outputs a phase difference signal P1 which indicates a phase difference between the detection signal S1 outputted from the light receiving unit 11A and the added signal S14. The phase comparing device 13 is preferably provided with a signal converting device 16 for generating a signal with an amplitude corresponding to the phase difference between the detection signal S1 and the added signal S14, and for outputting this generated signal as the phase difference signal P1. As the phase comparing device 13, it is possible to use (i) a phase comparator for comparing the phases of two alternate current signals and for outputting a signal with an amplitude (voltage) corresponding to a phase difference between the both signals, or (ii) a phase comparison circuit obtained by combining a phase comparator for comparing the phases of two alternate current signals and for outputting a pulse signal with a pulse width corresponding to a phase difference between the both signals and an integrator for integrating the pulse signal.

The phase comparing device 14 outputs a phase difference signal P4 which indicates a phase difference between the detection signal S4 outputted from the light receiving unit 11D and the added signal S14. The phase comparing device 14 is preferably provided with a signal converting device 17 for generating a signal with an amplitude corresponding to the phase difference between the detection signal S4 and the added signal S14, and for outputting this generated signal as the phase difference signal P4. As the phase comparing device 14, it is possible to use the phase comparator or the phase comparison circuit, as in the case of the phase comparing device 13.

The subtracting device 15 subtracts the phase difference signal P4 from the phase difference signal P1. As the subtracting device 15, a subtractor can be used, for example. A signal outputted from the subtracting device 15 is a tracing error signal TE1. Incidentally, the subtracting device 15 may be constructed to subtract the phase difference signal P1 from the phase difference signal P4.

Hereinafter, the specific operation of the tracking error signal generating apparatus 10 will be explained by taking a case as an example where the tracking error signal generating apparatus 10 is used for tracking control of the optical disc.

At first, when the reflected light R is irradiated onto the light receiving units 11A to 11D of the detecting device 11, the detection signals S1 and S4 outputted from the respective light receiving units 11A and 11D are expressed by the following equations (1) and (2), respectively, on the basis of the theory of scalar diffraction.

$$S1 = A \cos(\omega t + \Psi + \Phi) \quad (1)$$

$$S4 = A' \cos(\omega t \Psi - \Phi) \quad (2)$$

Incidentally, $\omega$ indicates a pit frequency, $\Psi$ indicates a phase component caused by that the pit depth is shifted from $\lambda/4n$, and $\Phi$ indicates a phase component depending on a shift between the spot of the light beam and the track. Moreover, A and A' depend on an optical axis shift in the radial direction of the optical disc, and they are equal if there is no optical axis shift. Incidentally, the "optical axis shift" is that the optical axis of the reflected light of the light beam is shifted from the center of the light receiving surface of the four-division light receiving element, caused by mounting errors and poor alignment (e.g. displacement or shift in position of an objective lens) of the optical system in an optical pickup, or the inclination of the recording surface of the recording medium.

Next, the added signal S14 outputted from the adding device 12 is expressed by the following equation (3).

$$S14 = S1 + S4 = D \cos(\omega t \Psi + \sigma) \quad (3)$$

Incidentally, a indicates a phase component, which is generated when the optical axis shift in the radial direction of the optical disc is generated, and thus A and A' are not equal.

Next, the phase comparison signal P1 outputted from the phase comparing device 13 and the phase comparison signal P4 outputted from the phase comparing device 14 are expressed by the following equations (4) and (5), respectively.

$$P1 = \Phi - \sigma \quad (4)$$

$$P4 = \Phi - \sigma \quad (5)$$

Next, the tracking error signal TE1 outputted from the subtracting device 15 is expressed by the following expression (6).

$$TE1 = P1 - P4 = 2\Phi \quad (6)$$

Next, the operation of the tracking error signal generating apparatus 10 will be further explained, on the basis of the waveforms of the signals generated in the tracking error signal generating apparatus 10.

Firstly, FIG. 2 shows the waveforms of the detection signal S1, the added signal S14 and the detection signal S4 in the tracking error signal generating apparatus 10. As can be seen from FIG. 2 and the above-mentioned equations, the phase difference between the detection signal S1 and the added signal S14 is $\Phi - \sigma$, and the phase difference between the detection signal S4 and the added signal S14 is $\Phi + \sigma$. These phase differences are caused by the shift between the spot of the light beam and the track, or the optical axis shift in the radial direction. These phase differences vary depending on the amount of the shifts. However, the phase difference between the detection signal S1 and the added signal S14 and the phase difference between the detection signal S4 and the added signal S14 do not vary depending on $\Psi$ caused by that the pit depth is shifted from $\lambda/4n$. Namely, these phase differences are not influenced by $\Psi$. This is because as can be seen from the above-mentioned equations, all of the detection signal S1, the detection signal S4 and the added signal S14 proceed by $\Psi$ in phase, so that the phase difference caused by $\Psi$ is not generated between the detection signal S1 and the added signal S14 nor between the detection signal S4 and the added signal S14.

Next, FIG. 3 shows a change in amplitude of the phase difference signal P1, with respect to the shift amount between the spot of the light beam and the track. As can be seen from FIG. 3, the phase component $\sigma$ caused by the optical axis shift in the radial direction of the optical disc appears as a minus offset component $ofs_\sigma$ in the phase difference signal P1. Moreover, FIG. 4 shows a change in amplitude of the phase difference signal P4, with respect to the shift amount between the spot of the light beam and the track. As can be seen from FIG. 4, the phase component $\sigma$ caused by the optical axis shift in the radial direction of the optical disc appears as a minus offset component $ofs_\sigma$ in the phase difference signal P4.

Next, FIG. 5 shows a change in amplitude of the tracking error signal TE1, with respect to the shift amount between the spot of the light beam and the track. The tracking error signal TE1 is obtained by subtracting the phase difference signal P4 shown in FIG. 4 from the phase difference signal P1 shown in FIG. 3. By this subtracting process, the offset components $ofs_\sigma$, included in the phase difference signal P1 and the phase difference signal P4, cancel each other and are eliminated. As a result, the amplitude of the tracking error signal TE1 corresponds to the shift amount ($\Phi$) between the spot of the light beam and the track, and does not include the component ($\sigma$) related to the optical axis shift in the radial direction of the optical disc nor the component ($\Psi$) related to the shift amount of the pit depth from $\lambda/4n$.

As described above, on the tracking error signal generating apparatus 10, the detection signals S1 and S4 respectively outputted from the light receiving units 11A and 11D located on one side of a boundary made by the dividing line DL1 are added, and the phases of the added signal S14 obtained by this addition and the detection signal S1 are compared, and the phases of the added signal S14 and the detection signal S4 are also compared. According to such construction, the phase difference between the added signal S14 and the detection signal S1 becomes $\Phi - \sigma$, and the amplitude of the phase difference signal P1 has a value corresponding to $\Phi - \sigma$. As a result, the amplitude of the phase difference signal P1 is relatively small. Therefore, it is possible to reduce the dynamic range of the phase comparing device 13 or the signal converting device 16. In the same manner as this, the phase difference between the added signal S14 and the detection signal S4 becomes Φ+σ, and the amplitude of the phase difference signal P4 has a value corresponding to Φ+σ. Then, the phase component σ caused by the optical axis shift in the radial direction is much smaller than the phase component Φ caused by the shift between the spot of the light beam and the track. As a result, the amplitude of the phase difference signal P4 is also relatively small. Therefore, it is possible to reduce the dynamic range of the phase comparing device 14 or the signal converting device 17. By this, it is possible to limit the dynamic range of each of the phase comparing device 13 (the signal converting device 16) and the phase comparing device 14 (the signal converting device 17) in a proper range, while considering responsiveness or the like to noise, such as dust and scratches on the recording surface of the recording medium, for example. Therefore, according to the tracking error signal generating apparatus 10 in the first embodiment of the present invention, it is possible to generate a stable tracking error signal and increase stability, reliability, or sensitivity of tracking control.

Moreover, according to the tracking error signal generating apparatus 10, it is possible to eliminate the phase component σ (the offset component of $s_o$) caused by the optical axis shift in the radial direction in the tracking error generation procedure. Therefore, it is possible to realize tracking control resistant to the optical axis shift in the radial direction.

Furthermore, according to the tracking error signal generating apparatus 10, the phase of the detection signal S1 and the phase of the added signal S14 are compared, while the phase of the detection signal S4 and the phase of the added signal S14 are compared. Then, the amplitude of the added signal S14 is about twice as much as that of the detection signal S1 or S4. As described above, by using the added signal with a relatively large amplitude as a reference signal for the phase comparison, it is possible to certainly realize the phase comparison. Therefore, it is possible to prevent troubles, such as false detection in tracking control and dropout.

Now, in order to further clarify the effect and the operation of the tracking error signal generating apparatus 10 in the first embodiment of the present invention, an outline is given for the problem of the tracking error signal generation circuit which adopts the conventional control method described in the above-mentioned patent document 1. FIG. 10 shows a tracking error signal generating apparatus 200 which adopts the conventional control method described in the above-mentioned patent document 1. FIG. 11 and FIG. 12 show the waveforms of signals in the conventional tracking error signal generating apparatus 200. On the conventional tracking error signal generating apparatus 200, the detection signal S1 and the detection signal S4 are compared by a phase comparing device 201. As shown in FIG. 11, the phase difference between the detection signal S1 and the detection signal S4 is 2Φ, so that the amplitude of a phase difference signal PT has a value corresponding to 2Φ. As a result, the amplitude of the phase difference signal PT becomes relatively large. Thus, if the dynamic range of the phase comparing device 201 is not set to be large, as shown in FIG. 12, the waveform of the phase difference signal PT decays (refer to a dashed-line portion in FIG. 12), and a proper tracking error signal cannot be generated. Thus it is not possible to accurately detect the shift amount between the spot of the light beam and the track. In contrast, if the dynamic range of the phase comparing device 201 is set to be large in order to prevent the decay of the waveform of the phase difference signal PT, it is not possible to properly adjust the responsiveness or the like to noise, such as dust and scratches on the recording surface of the recording medium. Thus it is not possible to ensure the stability of tracking servo. Unstable tracking servo likely causes such troubles that false detection occurs or the tracking servo drops out, because of dust and scratches on the recording surface.

On the other hand, according to the tracking error signal generating apparatus 10 in the first embodiment of the present invention, shown in FIG. 1, each of the amplitudes of the phase difference signals P1 and P4 is about a half of the amplitude of the phase difference signal PT in FIG. 10. Therefore, it is possible to reduce each of the dynamic ranges of the phase comparing devices 13 and 14, to ensure the stability of tracking servo, and to prevent the false detection and the dropout.

Incidentally, in the tracking error signal generating apparatus 10 shown in FIG. 1, the case where the tracking error signal is generated by using the detection signals S1 and S4 respectively outputted from the light receiving units 11A and 11D located on one side of the dividing DL1 is taken as an example, however, the present invention is not limited to this example. It is also possible to construct it such that the tracking error signal is generated by performing an adding process, a phase comparison process and a subtracting process with respect to the detection signals S2 and S3 respectively outputted from the light receiving units 11B and 11C located on the other side of the dividing DL1 in the same manner of using the detection signals S1 and S4.

Moreover, it can be also constructed to add the tracking error signal generated by using the detection signals S1 and S4 and the tracking error signal generated by using the detection signals S2 and S3 to each other, and to use a signal obtained by the addition as a final tracking error signal. According to such construction, it is possible to eliminate both of the optical axis shifts in two directions of the reflected light on the light receiving surface of the four-division light receiving element. Namely, it is possible to eliminate not only the optical axis shift in the direction of crossing the track of the recording medium (the radial direction of the optical disc) but also the optical axis shift in the direction along the track.

SECOND EMBODIMENT

Moreover, the technical ideas of the present invention can be also embodied as a tracking error signal generating method. Namely, the tracking error signal generating method in a second embodiment of the present invention is a tracking error signal generating method of generating a tracking error signal for tracking control which allows a light beam to follow a track on a recording surface of a recording medium, the tracking error signal generating method provided with: a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and of outputting detection signals corresponding to the reflected light received by the respective light receiving units; an adding process of adding the detection signals outputted from a first light receiving unit and a second light receiving unit, located on one side of a boundary made by the first dividing line, out of the four light receiving units and of outputting a result of the addition as an added signal; a first phase comparing process of outputting a first phase difference signal which indicates a phase difference between the detection signal outputted from the first light receiving unit and the added signal; a second phase comparing process of outputting a second phase difference signal which indicates a phase difference between the detection signal outputted from the second light receiving unit and the added signal; and a subtracting process of subtracting the second phase difference signal from the first phase difference signal. Even by the tracking error signal generating method having such construction, it is possible to realize the same operation and effect as those of the tracking error signal generating apparatus 10.

THIRD EMBODIMENT

A third embodiment of the present invention will be discussed. FIG. 13 shows the structure of a tracking error signal generating apparatus 110 in the third embodiment of the present invention. The tracking error signal generating apparatus 110 is an apparatus for generating a tracking error signal for tracking control which allows a light beam to follow a track on the recording surface of a recording medium. The tracking error signal generating apparatus 110 can be used mainly to realize tracking control for a recording medium of an optical type or magneto optical type, such as a DVD, CD, a MO (Magneto-Optical) disc, a DVD-ROM, a DVD-RAM, or a Blu-ray disc. For example, the tracking error signal generating apparatus 110 can be provided for a disc drive or the like, mounted on or connected to Blu-ray disc player/recorder, a computer, or the like. Incidentally, the tracking error signal generating apparatus 110 can be applied to a recording/reproducing apparatus for a non-rotary recording medium, for example, of such a type that information is recorded or reproduced by linearly displacing the recording medium or a pickup (head) in an X direction and a Y direction on the recording plane.

The tracking error signal generating apparatus 110 is provided with: a detecting device 11; an adding device 12; an adding device 13; a phase comparing device 114; a phase comparing device 115; and an adding device 116.

The detecting device 11 has four light receiving units 11A, 11B, 11C and 11D divided by a diving line DL1 and a dividing line DL2. Then, the detecting device 11 receives reflected light R from the recording surface of the recording medium with the four light receiving units 11A to 11D, and outputs detection signals S1, S2, S3 and S4 corresponding to the reflected light received by the respective four light receiving units 11A to 11D.

The diving line DL1 extends in a direction corresponding to a direction of crossing the track of the recording medium. Namely, if the spot of the light beam on the recording surface of the recording medium is displaced in the direction of crossing the track (e.g. the radial direction of the optical disc), an image of the reflected light R irradiated onto the light receiving units 11A to 11D is displaced in a direction along the dividing line DL1. On the other hand, the diving line DL2 extends in a direction corresponding to a direction along the track. Namely, if the spot of the light beam on the recording surface of the recording medium is displaced in the direction along the track, an image of the reflected light R irradiated onto the light receiving units 11A to 11D is displaced in a direction along the dividing line DL2.

As the detecting device 11, a four-division light receiving element can be used. According to the four-division light receiving element, it is possible to photoelectrically convert, on each light receiving unit, the reflected light R received by the four light receiving units. By this, it is possible to obtain four electrical signals corresponding to the quantity of light (intensity distribution) of respective portions of the reflected light R divided into the four portions. Then, the electrical signals can be used as the detection signals S1 to S4. Incidentally, the four-division light receiving element is normally disposed in the pickup, together with an optical system, such as a semiconductor laser, a beam splitter, and various lenses for detection.

The adding device 12 adds the detection signals S1 and S4 respectively outputted from the light receiving units 11A and 11D located on one side of a boundary made by the dividing DL1, out of the light receiving units 11A to 11D, and outputs the result of addition as an added signal S14. As the adding device 12, an adder and a waveform shaping circuit can be used.

The adding device 13 adds the detection signals S2 and S3 respectively outputted from the light receiving units 11B and 11C located on the other side of the boundary made by the dividing DL1, out of the light receiving units 11A to 11D, and outputs the result of addition as an added signal S23. As the adding device 13, an adder and a waveform shaping circuit can be used.

The phase comparing device 114 outputs a phase difference signal P1 which indicates a phase difference between the detection signal S1 outputted from the light receiving unit 11A and the added signal S14. The phase comparing device 114 is preferably provided with a signal converting device 117 for generating a signal with an amplitude corresponding to the phase difference between the detection signal S1 outputted from the light receiving unit 11A and the added signal S14, and for outputting this generated signal as the phase difference signal P1. As the phase comparing device 114, it is possible to use (i) a phase comparator for comparing the phases of two alternate current signals and for outputting a signal with an amplitude (voltage) corresponding to a phase difference between the both signals, or (ii) a phase comparison circuit obtained by combining a phase comparator for comparing the phases of two alternate current signals and for outputting a pulse signal with a pulse width corresponding to a phase difference between the both signals and an integrator for integrating the pulse signal.

The phase comparing device 115 outputs a phase difference signal P3 which indicates a phase difference between the detection signal S3 outputted from the light receiving unit 11C diagonally adjacent to the light receiving unit 11A and the added signal S23. The phase comparing device 115 is preferably provided with a signal converting device 118 for generating a signal with an amplitude corresponding to the phase difference between the detection signal S3 outputted from the light receiving unit 11C and the added signal S23, and for outputting this generated signal as the phase difference signal P3. As the phase comparing device 115, it is possible to use the phase comparator or the phase comparison circuit, as in the case of the phase comparing device 114.

The adding device 116 adds the phase difference signal P1 and the phase difference signal P3. As the adding device 116, an adder can be used, for example. Then, a signal outputted from the adding device 116 is a tracking error signal TE1, for example.

Hereinafter, the specific operation of the tracking error signal generating apparatus 110 will be explained by taking a case as an example where the tracking error signal generating apparatus 110 is used for tracking control of the optical disc.

At first, when the reflected light R is irradiated onto the light receiving units 11A to 11D of the detecting device 11, the detection signals S1 to S4 outputted from the respective light receiving units 11A to 11D are expressed by the following equations (7) to (10), respectively, on the basis of the theory of scalar diffraction.

$$S1 = A\cos(\omega t + \Psi + \Phi) \quad (7)$$

$$S2 = A\cos(\omega t - \Psi - \Phi) \quad (8)$$

$$S3 = A' \cos(\omega t - \Psi + \Phi) \quad (9)$$

$$S4 = A' \cos(\omega t + \Psi - \Phi) \quad (10)$$

Incidentally, ω indicates a pit frequency, Ψ indicates a phase component caused by that the pit depth is shifted from λ/4n, and Φ indicates a phase component depending on a shift between the spot of the light beam and the track. Moreover, A and A' depend on an optical axis shift in the radial direction of the optical disc, and they are equal if there is no optical axis shift. Incidentally, the "optical axis shift" herein is that the reflected light of the light beam is displaced or shifted in position on the light receiving surface of the four-division light receiving element, caused by mounting errors and poor alignment (e.g. displacement or shift in position of an objective lens) of the optical system in an optical pickup, or the inclination of the recording surface of the recording medium.

Next, the added signal S14 outputted from the adding device 12 and the added signal S23 outputted from the adding device 13 are expressed by the following equations (11) and (12), respectively.

$$S14 = S1 + S4 = D \cos(\omega t + \Psi + \sigma) \quad (11)$$

$$S23 = S2 + S3 = D \cos(\omega t - \Psi - \sigma) \quad (12)$$

Incidentally, σ indicates a phase component, which is generated when the optical axis shift in the radial direction of the optical disc is generated and thus A and A' are not equal.

Next, the phase comparison signal P1 outputted from the phase comparing device 114 and the phase comparison signal P3 outputted from the phase comparing device 115 are expressed by the following equations (13) and (14), respectively.

$$P1 = \Phi - \sigma \quad (13)$$

$$P3 = \Phi + \sigma \quad (14)$$

Next, the tracking error signal TE1 outputted from the adding device 116 is expressed by the following expression (15).

$$TE1 = P1 + P2 = 2\Phi \quad (15)$$

Next, the operation of the tracking error signal generating apparatus 110 will be further explained, on the basis of the waveforms of the signals generated in the tracking error signal generating apparatus 110.

Firstly, FIG. 14 shows the waveforms of the detection signal S1, the added signal S14, the detection signal S3 and the added signal S23 in the tracking error signal generating apparatus 110. As can be seen from FIG. 14 and the above-mentioned equations, the phase difference between the detection signal S1 and the added signal S14 is Φ−σ, and the phase difference between the detection signal S3 and the added signal S23 is Φ+σ. These phase differences are caused by the shift between the spot of the light beam and the track, or the optical axis shift in the radial direction. These phase differences vary depending on the amount of the shifts. However, the phase difference between the detection signal S1 and the added signal S14 and the phase difference between the detection signal S3 and the added signal S23 do not vary depending on Ψ caused by that the pit depth is shifted from λ/4n. Namely, these phase differences are not influenced by Ψ. This is because as can be seen from the above-mentioned equations, the detection signal S1 and the added signal S14 both proceed by Ψ in phase, so that the phase difference caused by Ψ is not generated between the both signals. In the same manner, the detection signal S3 and the added signal S23 both delays by Ψ in phase, so that the phase difference caused by Ψ is not generated between the both signals.

Next, FIG. 15 shows a change in amplitude of the phase difference signal P1, with respect to the shift amount between the spot of the light beam and the track. As can be seen from FIG. 15, the phase component σ caused by the optical axis shift in the radial direction of the optical disc appears as a minus offset component $-ofs_\sigma$ in the phase difference signal P1. Moreover, FIG. 16 shows a change in amplitude of the phase difference signal P3, with respect to the shift amount between the spot of the light beam and the track. As can be seen from FIG. 16, the phase component σ caused by the optical axis shift in the radial direction of the optical disc appears as a plus offset component $+ofs_\sigma$ in the phase difference signal P3.

As described above, according to the tracking error signal generating apparatus 110, it is possible to prevent the phase component Ψ caused by that the pit depth is shifted from λ/4n from appearing as a phase difference between two signals which are comparison targets of the phase comparing device 114. By this, it is possible to reduce an amplitude width or a peak-to-peak width of the phase difference signal P1. By this, it is possible to reduce the dynamic range of the phase comparing device 114. In the same manner, it is also possible to reduce the dynamic range of the phase comparing device 115. For example, it is possible to limit the dynamic range of each of the phase comparing devices 114 and 115 in a proper range, while considering responsiveness or the like to noise, such as dust and scratches on the recording surface of the recording medium, for example. Therefore, according to the tracking error signal generating apparatus 110 in the third embodiment of the present invention, it is possible to generate a stable tracking error signal and increase stability, reliability, or sensitivity of tracking control.

Moreover, according to the tracking error signal generating apparatus 110, it is possible to eliminate the phase component σ (the offset component $ofs_\sigma$) caused by the optical axis shift in the radial direction in the tracking error generation procedure. Therefore, it is possible to realize tracking control resistant to the optical axis shift in the radial direction.

Furthermore, according to the tracking error signal generating apparatus 110, the phase of the detection signal S1 and the phase of the added signal S14 are compared, while the phase of the detection signal S3 and the phase of the added signal S23 are compared. Then, the amplitude of the added signal S14 is about twice as much as that of the detection signal S1, and the amplitude of the added signal S23 is about twice as much as that of the detection signal S3. As described above, by using the added signal with a relatively large amplitude as a signal for the phase comparison, it is possible to certainly realize the phase comparison. Therefore, it is possible to prevent troubles, such as false detection in tracking control and dropout.

Now, in order to further clarify the effect and the operation of the tracking error signal generating apparatus 110 in the third embodiment of the present invention, an outline is given for the problem of the tracking error signal generation circuit which adopts the conventional control method described in the above-mentioned patent document 1. FIG. 20 shows a tracking error signal generating apparatus 1200 which adopts the conventional control method described in the above-mentioned patent document 1. FIG. 21 and FIG. 22 show the waveforms of signals in the conventional tracking error signal generating apparatus 1200. On the conventional tracking error signal generating apparatus 1200, a sum signal ST obtained by adding all the detection signals S1, S2, S3 and S4 and the detection signal S1 are compared. Thus, as shown in FIG. 21, the phase component Ψ caused by that the pit depth is shifted from λ/4n appears as a phase difference between two signals which are comparison targets of the phase comparing device 1214, i.e., as a phase difference $D_p$ between the detection signal S1 and the sum signal ST. As a result, as shown in FIG. 22, an offset component of $s_\psi$ corresponding to the phase component Ψ appears in a phase difference signal PT1. Thus, the amplitude of the phase difference signal PT1 or a peak-to-peak amplitude increases. Moreover, the phase component Ψ is larger than the phase component σ, so that if it is desired to perform tracking control with respect to an optical disc with a pit depth of λ/6n, the amplitude of the phase difference signal PT1 or the peak-to-peak width increases greatly. As a result, if the dynamic range of the phase comparing device 1214 is not set to be large enough, the waveform of the phase difference signal PT1 decays (refer to a dashed-line portion in FIG. 22). In this case, the waveform of a tracking error signal TE3 decays, and thus it is not possible to accurately detect the shift amount between the spot of the light beam and the track. In contrast, if the dynamic range of the phase comparing device 1214 is set to be large in order to prevent the decay of the waveform of the tracking error signal TE3, it is not possible to properly adjust the responsiveness or the like to noise such as dust and scratches on the recording surface of the recording medium. Thus it is not possible to ensure the stability of tracking servo. Unstable tracking servo likely causes such troubles that false detection occurs or the tracking servo drops out, because of dust and scratches on the recording surface.

On the other hand, according to the tracking error signal generating apparatus 110 in the third embodiment of the present invention, shown in FIG. 13, even if the tracking servo is performed with respect to the optical disc with a pit depth of λ/6n, it is possible to avoid a risk that the troubles occur.

FOURTH EMBODIMENT

A fourth embodiment of the present invention will be discussed. FIG. 17 shows the structure of a tracking error signal generating apparatus 120 in the fourth embodiment of the present invention. Incidentally, in the tracking error signal generating apparatus 120 in FIG. 17, the same constitutional elements as those of the tracking error signal generating apparatus 110 in FIG. 13 carry the same numerical references, and the explanation thereof is omitted.

As shown in FIG. 17, the tracking error signal generating apparatus 120 is provided with: a detecting device 11; an adding device 12; an adding device 13; a phase comparing device 114; a phase comparing device 115; and an adding device 116. Moreover, the tracking error signal generating apparatus 120 is further provided with: a phase comparing device 121; a phase comparing device 122; an adding device 123; and a subtracting device 124.

The phase comparing device 121 outputs a phase difference signal P4 which indicates a phase difference between the detection signal S4 outputted from the light receiving unit 11D and the added signal S14. The phase comparing device 121 is preferably provided with a signal converting device 125 for generating a signal with an amplitude corresponding to the phase difference between the detection signal S4 outputted from the light receiving unit 11D and the added signal S14, and for outputting this generated signal as the phase difference signal P4. As the phase comparing device 121, it is possible to use the phase comparator or the phase comparison circuit, as in the case of the phase comparing device 114.

The phase comparing device 122 outputs a phase difference signal P2 which indicates a phase difference between the detection signal S2 outputted from the light receiving unit 11B diagonally adjacent to the light receiving unit 11D and the added signal S23. The phase comparing device 122 is preferably provided with a signal converting device 126 for generating a signal with an amplitude corresponding to the phase difference between the detection signal S2 outputted from the light receiving unit 11B and the added signal S23, and for outputting this generated signal as the phase difference signal P2. As the phase comparing device 122, it is possible to use the phase comparator or the phase comparison circuit, as in the case of the phase comparing device 114.

The adding device 123 adds the phase difference signal P4 and the phase difference signal P2. As the adding device 123, an adder can be used, for example.

The subtracting device 124 subtracts a phase difference added signal P24 which indicates a result of the addition by the adding device 123, from a phase difference added signal P13 which indicates a result of the addition by the adding device 116. As the subtracting device 124, a subtractor can be used, for example. As a result of the subtraction by the subtracting device 124, a tracing error signal TE2 is obtained.

According to the tracking error signal generating apparatus 120 having such a structure, in addition to the operation and the effect of the tracking error signal generating apparatus 110 described above, it is also possible to eliminate the optical axis shift in the direction along the track of the recording medium, from the tracking error signal TE2. Namely, the offset component caused by the optical axis shift in the direction along the track appears equally in the phase difference added signals P13 and P24. Therefore, by subtracting the phase difference added signals P13 and P24 from each other by the subtracting device 124, the offset components, caused by the optical axis shift in the direction along the track, cancel each other, so that the offset component can be eliminated from the tracking error signal TE2. Therefore, it is possible to improve the accuracy of tracking control.

FIFTH EMBODIMENT

A fifth embodiment of the present invention will be discussed. The technical ideas of the present invention can be also embodied as a tracking error signal generating method. Namely, the tracking error signal generating method in a fifth embodiment of the present invention is a tracking error signal generating method of generating a tracking error signal for tracking control which allows a light beam to follow a track on a recording surface of a recording medium, the tracking error signal generating method provided with: a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and for outputting detection signals corresponding to the reflected light received by the respective light receiving units; a first adding process of adding the detection signals outputted from a first light receiving unit and a second light receiving unit, located on one side of a boundary made by the first dividing line, out of the four light receiving units and for outputting a result of the addition as a first added signal; a second adding process of adding the detection signals outputted from a third light receiving unit and a fourth light receiving unit, located on the other side of the boundary made by the first dividing line, out of the four light receiving units and for outputting a result of the addition as a second added signal; a first phase comparing process of outputting a first phase difference signal which indicates a phase difference between the detection signal outputted from the first light receiving unit and the first added signal; a second phase comparing process of outputting a second phase difference signal which indicates a phase difference between the detection signal outputted from the third light receiving unit diagonally adjacent to the first light receiving unit and the second added signal; and a third adding process of adding the first phase difference signal and the second phase difference signal to each other. Even by the tracking error signal generating method having such construction, it is possible to realize the same operation and effect as those of the tracking error signal generating apparatus 110.

Moreover, the following processes may be added to this tracking error signal generating method. Namely, the processes which may be added are: a third phase comparing process of outputting a third phase difference signal which indicates a phase difference between the detection signal outputted from the second light receiving unit and the first added signal; a fourth phase comparing process of outputting a fourth phase difference signal which indicates a phase difference between the detection signal outputted from the fourth light receiving unit diagonally adjacent to the second light receiving unit and the second added signal; a fourth adding process of adding the third phase difference signal and the fourth phase difference signal to each other; and a subtracting process of subtracting a fourth added signal which indicates a result of the addition by said fourth adding device, from a third added signal which indicates a result of the addition by said third adding device. According to the tracking error signal generating method including the added processes, it is possible to realize the same operation and effect as those of the tracking error signal generating apparatus 120.

EXAMPLES

Hereinafter, examples of the present invention will be explained with reference to the drawings. In the following examples, the tracking error signal generating apparatus of the present invention is applied to a tracking control system of an optical disc player, which is one preferred example for carrying out the present invention.

FIG. 6 shows a tracking error signal generating apparatus in a first example of the present invention, together with an optical disc, a pickup, and an object lens drive circuit for tracking control. In FIG. 6, a pickup 51 is provided with: a semiconductor laser 53 for outputting a light beam to an optical disc 52; an objective lens 54 for focusing the light beam on the optical disc 52; an actuator 56 for driving the objective lens 54 in accordance with a drive signal outputted from a drive circuit 55; a four-division light receiving element 57; a beam splitter 58 for leading reflected light of the light beam from the optical disc 52 to the four-division light receiving element 57; and other elements necessary to construct a general optical pickup. A tracking error signal generating apparatus 60 is provided with: the four-division light receiving element 57 in the pickup 51; and a signal processing circuit 61.

FIG. 7 shows the structure of the tracking error signal generating apparatus 60. The four-division light receiving element 57 has four light receiving units 57A to 57D, divided by a dividing line DL1 extending in a direction corresponding to a direction of crossing the track of the optical disc 52 (the radial direction of the optical disc 52) and a dividing line DL2 extending in a direction along the track (the track direction). It receives the reflected light from the optical disc 52 with the light receiving units 57A to 57D, and outputs detection signals S1 to S4 corresponding to the reflected light received by the light receiving units 57A to 57D, respectively.

The signal processing circuit 61 is provided with: two adders 62 and 63 located on the input side; four phase comparison circuits 64, 65, 66 and 67; two subtractor 68 located on the output side; and adder 70.

The adder 62 adds the detection signals S1 and S4 respectively outputted from the light receiving units 57A and 57D, and outputs the result as an added signal S14. The adder 63 adds the detection signals S2 and S3 respectively outputted from the light receiving units 57B and 57C, and outputs the result as an added signal S23.

The phase comparison circuit 64 outputs a phase difference signal P1 which indicates a phase difference between the detection signal S1 and the added signal S14. The phase comparison circuit 65 outputs a phase difference signal P4 which indicates a phase difference between the detection signal S4 and the added signal S14. The phase comparison circuit 66 outputs a phase difference signal P3 which indicates a phase difference between the detection signal S3 and the added signal S23. The phase comparison circuit 67 outputs a phase difference signal P2 which indicates a phase difference between the detection signal S2 and the added signal S23.

The subtractor 68 subtracts the phase difference signal P4 from the phase difference signal P1, and outputs the result as a phase difference subtraction signal P14. The subtractor 69 subtracts the phase difference signal P2 from the phase difference signal P3, and outputs the result as a phase difference subtraction signal P32

The adder 70 adds the phase difference subtraction signals P14 and P32 each other, and outputs the result as a tracking error signal TE3. The tracking error signal TE3 is supplied to the drive circuit 55.

FIG. 8 shows the inner structure of the phase comparison circuit 64. As shown in FIG. 8, the phase comparison circuit 64 is provided with: two waveform shaping circuits 71 and 72 located on the input side; a pulse signal processing circuit 73; and an integrator 74.

Hereinafter, the operation of the phase comparison circuit 64 will be explained with reference to FIG. 8 and FIG. 9. Incidentally, FIG. 9 shows the waveform of each signal in the phase comparison circuit 64. The left side of FIG. 9 shows each signal waveform if the phase of the detection signal S1 proceeds more than the phase of the added signal S14. The right side of FIG. 9 shows each signal waveform if the phase of the detection signal S1 delays more than the phase of the added signal S14.

The detection signal S1 is inputted to one input terminal of the phase comparison circuit 64, and firstly, supplied to the waveform shaping circuit 71. On the waveform shaping circuit 71, the detection signal S1 is converted by a pulse converter 81 to a pulse signal Sa on the basis of the zero cross point of the waveform. Then, a pulse signal Sb with a reversed pulse level of the pulse signal Sa is generated by an inverter 82. Meanwhile, the added signal S14 is inputted to the other input terminal of the phase comparison circuit 64, and firstly, supplied to the waveform shaping circuit 72. On the waveform shaping circuit 72, the added signal S14 is converted by a pulse converter 83 to a pulse signal Sc on the basis of the zero cross point of the waveform. Then, a pulse signal Sd with a reversed pulse level of the pulse signal Sc is generated by an inverter 84.

Then, the pulse signals Sa and Sc are inputted to a pulse input terminal $C_k$ and a clear pulse terminal $C_L$ of a D-type flip-flop 85, respectively. As a result, a pulse signal Se is obtained from an output terminal Q of the D-type flip-flop 85.

On the other hand, the pulse signals Sb and Sd are inputted to a pulse input terminal $C_k$ and a clear pulse terminal $C_L$ of a D-type flip-flop 86, respectively. As a result, a pulse signal Sf is obtained from an output terminal Q of the D-type flip-flop 86.

Moreover, the pulse signals Sc and Sa are inputted to a pulse input terminal $C_k$ and a clear pulse terminal $C_L$ of a D-type flip-flop 87, respectively. As a result, a pulse signal Sg is obtained from an output terminal Q of the D-type flip-flop 87. On the other hand, the pulse signals Sd and Sb are inputted to a pulse input terminal $C_k$ and a clear pulse terminal $C_L$ of a D-type flip-flop 88, respectively. As a result, a pulse signal Sh is obtained from an output terminal Q of the D-type flip-flop 88.

Then, the pulse signals Se and Sf are added to each other by an adder 89, and a signal obtained by the addition is supplied to a plus input terminal of a differential amplifier 91. In contrast, the pulse signals Sg and Sh are added to each other, and a signal obtained by the addition is supplied to a minus input terminal of the differential amplifier 91. As a result, a pulse signal S1 is obtained from the differential amplifier 91. The pulse signal S1 is a plus level of pulse signal with a pulse width corresponding to a phase difference between the detection signal S1 and the added signal S14, if the phase of the detection signal S1 proceeds more than the phase of the added signal S14. The pulse signal S1 is a minus level of pulse signal with a pulse width corresponding to a phase difference between the detection signal S1 and the added signal S14, if the phase of the detection signal S1 delays more than the phase of the added signal S14.

Then, the pulse signal Si is supplied to the integrator 74. On the integrator 74, the pulse signal Si is integrated, and the phase difference signal P1 is obtained having an amplitude corresponding to the pulse width of the pulse signal Si and the plus/minus of the pulse level of the pulse signal Si (refer to FIG. 3).

The phase comparison circuits 65, 66, and 67 have the same structure as that of the phase comparison circuit 64, and operate in the same manner.

FIG. 18 shows a tracking error signal generating apparatus in a second example of the present invention, together with an optical disc, a pickup, and an object lens drive circuit for tracking control. In FIG. 18, a pickup 51 is provided with: a semiconductor laser 53 for outputting a light beam to an optical disc 52; an objective lens 54 for focusing the light beam on the optical disc 52; an actuator 56 for driving the objective lens 54 in accordance with a drive signal outputted from a drive circuit 55; a four-division light receiving element 57; a beam splitter 58 for leading reflected light of the light beam from the optical disc 52 to the four-division light receiving element 57; and other elements necessary to construct a general optical pickup. A tracking error signal generating apparatus 160 is provided with: the four-division light receiving element 57 in the pickup 51; and a signal processing circuit 161.

FIG. 19 shows the structure of the tracking error signal generating apparatus 160. The four-division light receiving element 57 has four light receiving units 57A to 57D, divided by a dividing line DL1 extending in a direction corresponding to a direction of crossing the track of the optical disc 52 and a dividing line DL2 extending in a direction along the track. It receives the reflected light from the optical disc 52 with the light receiving units 57A to 57D, and outputs detection signals S1 to S4 corresponding to the reflected light received by the light receiving units 57A to 57D, respectively.

The signal processing circuit 161 is provided with: two adders 62 and 63 located on the input side; four phase comparison circuits 164, 165, 166, and 167; and two adders 168 and 169 located on the output side; and a subtractor 170.

The adder 62 adds the detection signals S1 and S4 respectively outputted from the light receiving units 57A and 57D, and outputs the result as an added signal S14. The adder 63 adds the detection signals S2 and S3 respectively outputted from the light receiving units 57B and 57C, and outputs the result as an added signal S23.

The phase comparison circuit 164 outputs a phase difference signal P1 which indicates a phase difference between the detection signal S1 and the added signal S14. The phase comparison circuit 165 outputs a phase difference signal P3 which indicates a phase difference between the detection signal S3 and the added signal S23. The phase comparison circuit 166 outputs a phase difference signal P2 which indicates a phase difference between the detection signal S2 and the added signal S23. The phase comparison circuit 167 outputs a phase difference signal P4 which indicates a phase difference between the detection signal S4 and the added signal S14.

The adder 168 adds the phase difference signals P1 and P3, and outputs the result as a phase difference added signal P13. The adder 169 adds the phase difference signals P2 and P4, and outputs the result as a phase difference added signal P24.

The subtractor 170 subtracts the phase difference added signal P24 from the phase difference added signal P13, and outputs the result as a tracking error signal TE4. The tracking error signal TE4 is supplied to the drive circuit 55.

The tracking error signal generating apparatus 160 having such a structure performs the same operation and effect as those of the tracking error signal generating apparatus 120 shown in FIG. 17.

Incidentally, in the present invention, various changes may be made, if desired, without departing from the essence or spirit of the invention which can be read from the claims and the entire specification. A tracking error signal generating apparatus and a tracking error signal generating method, all of which involve such changes, are also intended to be within the technical scope of the present invention.

INDUSTRIAL APPLICABILITY

The tracking error signal generating apparatus and the tracking error signal generating method of the present invention can be applied to a recording medium, such as a DVD and a CD (Compact Disc), a recording apparatus, or a reproducing apparatus.

The invention claimed is:

1. A tracking error signal generating apparatus for generating a tracking error signal for tracking control which allows a light beam to follow a track on a recording surface of a recording medium, said tracking error signal generating apparatus comprising:
a detecting device, which has four light receiving units divided by a first dividing line extending in a direction corresponding to a direction of crossing the track and a second dividing line extending in a direction corresponding to a direction along the track, for receiving reflected light of the light beam from the recording surface with the four light receiving units and for outputting detection signals corresponding to the reflected light received by the respective light receiving units;
an adding device for adding the detection signals outputted from a first light receiving unit and a second light receiving unit, located on one side of a boundary made by the first dividing line, out of the four light receiving units and for outputting a result of the addition as an added signal;

a first phase comparing device for outputting a first phase difference signal which indicates a phase difference between the detection signal outputted from the first light receiving unit and the added signal;

a second phase comparing device for outputting a second phase difference signal which indicates a phase difference between the detection signal outputted from the second light receiving unit and the added signal; and a subtracting device for subtracting the second phase difference signal from the first phase difference signal.

2. The tracking error signal generating apparatus according to claim 1, wherein said first phase comparing device has a first signal converting device for generating a signal with an amplitude corresponding to the phase difference between the detection signal outputted from the first light receiving unit and the added signal and for outputting this generated signal as the first phase difference signal, and said second phase comparing device has a second signal converting device for generating a signal with an amplitude corresponding to the phase difference between the detection signal outputted from the second light receiving unit and the added signal and for outputting this generated signal as the second phase difference signal.

3. A tracking error signal generating method of generating a tracking error signal for tracking control which allows a light beam to follow a track on a recording surface of a recording medium, said tracking error signal generating method comprising:

a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and of outputting detection signals corresponding to the reflected light received by the respective light receiving units;

an adding process of adding the detection signals outputted from a first light receiving unit and a second light receiving unit, located on one side of a boundary made by the first dividing line, out of the four light receiving units and of outputting a result of the addition as an added signal;

a first phase comparing process of outputting a first phase difference signal which indicates a phase difference between the detection signal outputted from the first light receiving unit and the added signal;

a second phase comparing process of outputting a second phase difference signal which indicates a phase difference between the detection signal outputted from the second light receiving unit and the added signal; and a subtracting process of subtracting the second phase difference signal from the first phase difference signal.

4. A tracking error signal generating apparatus for generating a tracking error signal for tracking control which allows a light beam to follow a track on a recording surface of a recording medium, said tracking error signal generating apparatus comprising:

a detecting device, which has four light receiving units divided by a first dividing line extending in a direction corresponding to a direction of crossing the track and a second dividing line extending in a direction corresponding to a direction along the track, for receiving reflected light of the light beam from the recording surface with the four light receiving units and for outputting detection signals corresponding to the reflected light received by the respective light receiving units;

a first adding device for adding the detection signals outputted from a first light receiving unit and a second light receiving unit, located on one side of a boundary made by the first dividing line, out of the four light receiving units and for outputting a result of the addition as a first added signal;

a second adding device for adding the detection signals outputted from a third light receiving unit and a fourth light receiving unit, located on the other side of the boundary made by the first dividing line, out of the four light receiving units and for outputting a result of the addition as a second added signal;

a first phase comparing device for outputting a first phase difference signal which indicates a phase difference between the detection signal outputted from the first light receiving unit and the first added signal;

a second phase comparing device for outputting a second phase difference signal which indicates a phase difference between the detection signal outputted from the third light receiving unit diagonally adjacent to the first light receiving unit and the second added signal; and a third adding device for adding the first phase difference signal and the second phase difference signal to each other.

5. The tracking error signal generating apparatus according to claim 4, wherein said first phase comparing device has a first signal converting device for generating a signal with an amplitude corresponding to the phase difference between the detection signal outputted from the first light receiving unit and the first added signal and for outputting this generated signal as the first phase difference signal, and said second phase comparing device has a second signal converting device for generating a signal with an amplitude corresponding to the phase difference between the detection signal outputted from the third light receiving unit and the second added signal and for outputting this generated signal as the second phase difference signal.

6. The tracking error signal generating apparatus according to claim 4, further comprising:

a third phase comparing device for outputting a third phase difference signal which indicates a phase difference between the detection signal outputted from the second light receiving unit and the first added signal;

a fourth phase comparing device for outputting a fourth phase difference signal which indicates a phase difference between the detection signal outputted from the fourth light receiving unit diagonally adjacent to the second light receiving unit and the second added signal;

a fourth adding device for adding the third phase difference signal and the fourth phase difference signal to each other; and a subtracting device for subtracting a fourth added signal which indicates a result of the addition by said fourth adding device from a third added signal which indicates a result of the addition by said third adding device.

7. The tracking error signal generating apparatus according to claim 6, wherein said third phase comparing device has a third signal converting device for generating a signal with an amplitude corresponding to the phase difference between the detection signal outputted from the second light receiving unit and the first added signal and for outputting this generated signal as the third phase difference signal, and said fourth phase comparing device has a fourth signal converting device for generating a signal with an amplitude corresponding to the phase difference between the detection signal outputted from the fourth light receiving unit and the second added signal and for outputting this generated signal as the fourth phase difference signal.

8. A tracking error signal generating method of generating a tracking error signal for tracking control which allows a light beam to follow a track on a recording surface of a recording medium, said tracking error signal generating method comprising:

a light detecting process of receiving, by using a detecting device which has four light receiving units divided by a first dividing line extending in a direction corresponding to a direction of crossing the track and a second dividing line extending in a direction corresponding to a direction along the track, reflected light of the light beam from the recording surface with the four light receiving units and for outputting detection signals corresponding to the reflected light received by the respective light receiving units;

a first adding process of adding the detection signals outputted from a first light receiving unit and a second light receiving unit, located on one side of a boundary made by the first dividing line, out of the four light receiving units and for outputting a result of the addition as a first added signal;

a second adding process of adding the detection signals outputted from a third light receiving unit and a fourth light receiving unit, located on the other side of the boundary made by the first dividing line, out of the four light receiving units and for outputting a result of the addition as a second added signal;

a first phase comparing process of outputting a first phase difference signal which indicates a phase difference between the detection signal outputted from the first light receiving unit and the first added signal;

a second phase comparing process of outputting a second phase difference signal which indicates a phase difference between the detection signal outputted from the third light receiving unit diagonally adjacent to the first light receiving unit and the second added signal; and a third adding process of adding the first phase difference signal and the second phase difference signal to each other.

9. The tracking error signal generating method according to claim 8, further comprising:

a third phase comparing process of outputting a third phase difference signal which indicates a phase difference between the detection signal outputted from the second light receiving unit and the first added signal;

a fourth phase comparing process of outputting a fourth phase difference signal which indicates a phase difference between the detection signal outputted from the fourth light receiving unit diagonally adjacent to the second light receiving unit and the second added signal;

a fourth adding process of adding the third phase difference signal and the fourth phase difference signal to each other; and a subtracting process of subtracting a fourth added signal which indicates a result of the addition by said fourth adding process, from a third added signal which indicates a result of the addition by said third adding process.

* * * * *